US012424749B2

(12) United States Patent
Bae et al.

(10) Patent No.: US 12,424,749 B2
(45) Date of Patent: Sep. 23, 2025

(54) ELECTRONIC DEVICE INCLUDING MULTI-FEED ANTENNA

(71) Applicant: SAMSUNG ELECTRONICS CO., LTD., Suwon-si (KR)

(72) Inventors: Hongpyo Bae, Suwon-si (KR); Minkyung Lee, Suwon-si (KR); Kyungmoon Seol, Suwon-si (KR); Jaehyung Kim, Suwon-si (KR); Gyubok Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 148 days.

(21) Appl. No.: 18/380,979

(22) Filed: Oct. 17, 2023

(65) Prior Publication Data

US 2024/0079780 A1 Mar. 7, 2024

Related U.S. Application Data

(63) Continuation of application No. PCT/KR2023/013201, filed on Sep. 4, 2023.

(30) Foreign Application Priority Data

Sep. 7, 2022 (KR) ........................ 10-2022-0113584
Oct. 17, 2022 (KR) ........................ 10-2022-0133595

(51) Int. Cl.
*H01Q 5/35* (2015.01)
*H01Q 1/24* (2006.01)
*H01Q 23/00* (2006.01)

(52) U.S. Cl.
CPC ............... *H01Q 5/35* (2015.01); *H01Q 1/243* (2013.01); *H01Q 23/00* (2013.01)

(58) Field of Classification Search
None
See application file for complete search history.

(56) References Cited

U.S. PATENT DOCUMENTS 9,762,710 B2 9/2017 Lee et al.
10,446,916 B2 10/2019 Kim et al.
(Continued)

FOREIGN PATENT DOCUMENTS

EP 3 656 113 B1 4/2022
KR 10-2017-0087748 A 7/2017
(Continued)

OTHER PUBLICATIONS

International Search Report (PCT/ISA/210) issued on Dec. 27, 2023 by the International Searching Authority for International Patent Application No. PCT/KR2023/013201.
Written Opinion (PCT/ISA/237) issued on Dec. 27, 2023 by the International Searching Authority for International Patent Application No. PCT/KR2023/013201.

*Primary Examiner* — Wilson Lee
(74) *Attorney, Agent, or Firm* — Sughrue Mion, PLLC

(57) ABSTRACT

An electronic device includes: a first housing; a second housing movably coupled to the first housing, the second housing being configured to slide with respect to the first housing along a first direction and a second direction that is opposite to the first direction; a display including a first area and a second area, the first area being disposed on the second housing, the second area extending from the first area, the second area being configured to (i) be exposed to an outside environment as the second housing moves in the first direction and (ii) be rolled into the first housing as the second housing moves in the second direction; and at least one processor configured to communicate with an external electronic device and to receive and/or transmit a communication signal by feeding to a first conductive portion and/or a second conductive portion.

20 Claims, 29 Drawing Sheets

(56) References Cited

U.S. PATENT DOCUMENTS

| | | | | |
|---|---|---|---|---|
| 10,734,705 | B2 | 8/2020 | Choi et al. | |
| 11,145,953 | B2 | 10/2021 | Kim et al. | |
| 11,923,599 | B2 | 3/2024 | Hsu et al. | |
| 2017/0338549 | A1 | 11/2017 | Yoo et al. | |
| 2021/0344783 | A1* | 11/2021 | Jeong | G06F 1/1616 |
| 2022/0321687 | A1* | 10/2022 | Kong | H04M 1/0277 |
| 2022/0416405 | A1* | 12/2022 | Harper | H04W 4/80 |
| 2022/0416819 | A1 | 12/2022 | Kim et al. | |
| 2023/0085200 | A1 | 3/2023 | Oh et al. | |
| 2023/0085568 | A1* | 3/2023 | Jin | G06F 1/1677 455/575.1 |
| 2023/0092831 | A1 | 3/2023 | Kim et al. | |
| 2023/0161385 | A1* | 5/2023 | Shin | G06F 1/1698 361/297 |
| 2023/0178876 | A1 | 6/2023 | Park et al. | |

FOREIGN PATENT DOCUMENTS

| | | | |
|---|---|---|---|
| KR | 10-2018-0021432 | A | 3/2018 |
| KR | 10-2019-0115888 | A | 10/2019 |
| KR | 10-2020-0042611 | A | 4/2020 |
| KR | 10-2021-0111991 | A | 9/2021 |
| KR | 10-2021-0116380 | A | 9/2021 |
| KR | 10-2314790 | B1 | 10/2021 |
| KR | 10-2021-0145381 | A | 12/2021 |
| KR | 10-2022-0027600 | A | 3/2022 |
| KR | 10-2396315 | B1 | 5/2022 |
| KR | 10-2695275 | B1 | 8/2024 |

* cited by examiner

ELECTRONIC DEVICE INCLUDING MULTI-FEED ANTENNA

CROSS-REFERENCE TO RELATED APPLICATIONS

This application is a continuation of PCT/KR2023/013201, filed on Sep. 4, 2023, at the Korean Intellectual Property Receiving Office and claims priority under 35 U.S.C. § 119 to Korean Patent Application No. 10-2022-0113584, filed on Sep. 7, 2022 at the Korean Intellectual Property Office and to Korean Patent Application No. 10-2022-0133595, filed on Oct. 17, 2022 at the Korean Intellectual Property Office, the disclosures of each which are incorporated by reference herein in their entireties.

TECHNICAL FIELD

Various embodiments of the present disclosure relate to an electronic device including an antenna having a multi-feed structure.

BACKGROUND

An electronic device including a large-screen display may increase user utilization. As the demand for an electronic device having high portability increases, the electronic device may include a deformable display. The deformable display may be deformable in a sliding scheme, deformable in a foldable scheme, or deformable in a rollable scheme.

SUMMARY

An electronic device may include: a first housing; a second housing movably coupled to the first housing, the second housing being configured to slide with respect to the first housing along a first direction and a second direction that is opposite to the first direction; a display including a first area and a second area, the first area being disposed on the second housing, the second area extending from the first area, the second area being configured to (i) be exposed to an outside environment as the second housing moves in the first direction and (ii) be rolled into the first housing as the second housing moves in the second direction; and at least one processor configured to communicate with an external electronic device. The first housing may include a side member. The side member may include: a first surface facing a fourth direction that is opposite to a third direction, the first area of the display facing the third direction, a second surface opposite to the first surface, and side surfaces at least partially surrounding the first surface and the second surface. The side surfaces may include a third surface facing the second direction. The third surface may include: a first conductive portion disposed along a first part of a boundary of the third surface; and a second conductive portion disposed along a second part of the boundary of the third surface, the second conductive portion being electrically separated from the first conductive portion. The at least one processor may be further configured to receive and/or transmit a communication signal by feeding to the first conductive portion and/or the second conductive portion.

An electronic device may include: a first housing that includes a first conductive portion and a second conductive portion, the second conductive portion being electrically separated from the first conductive portion; a second housing movably coupled to the first housing, the second housing being configured to slide with respect to the first housing along a first direction and a second direction that is opposite to the first direction; a display including a first area and a second area, the first area being disposed on the second housing, the second area extending from the first area, the second area being configured to (i) be exposed to an outside environment as the second housing moves in the first direction and (ii) be rolled into the first housing as the second housing moves in the second direction; a radio frequency front end (RFFE) comprising a coupler electrically connectable to the first conductive portion and the second conductive portion; a switch circuit configured to alternatively connect the first conductive portion with the RFFE or connect the second conductive portion with the RFFE; a radio frequency integrated circuit (RFIC) communicably disposed between the at least one processor and the RFFE; and at least one processor. The at least one processor may be configured to: transmit a first signal to an external electronic device through the first conductive portion or the second conductive portion based on a state of a coupling signal of the first signal; and receive a second signal from the external electronic device through the first conductive portion or the second conductive portion based on a state of the second signal that is identified based on the second signal.

DETAILED DESCRIPTION

Figure 1:
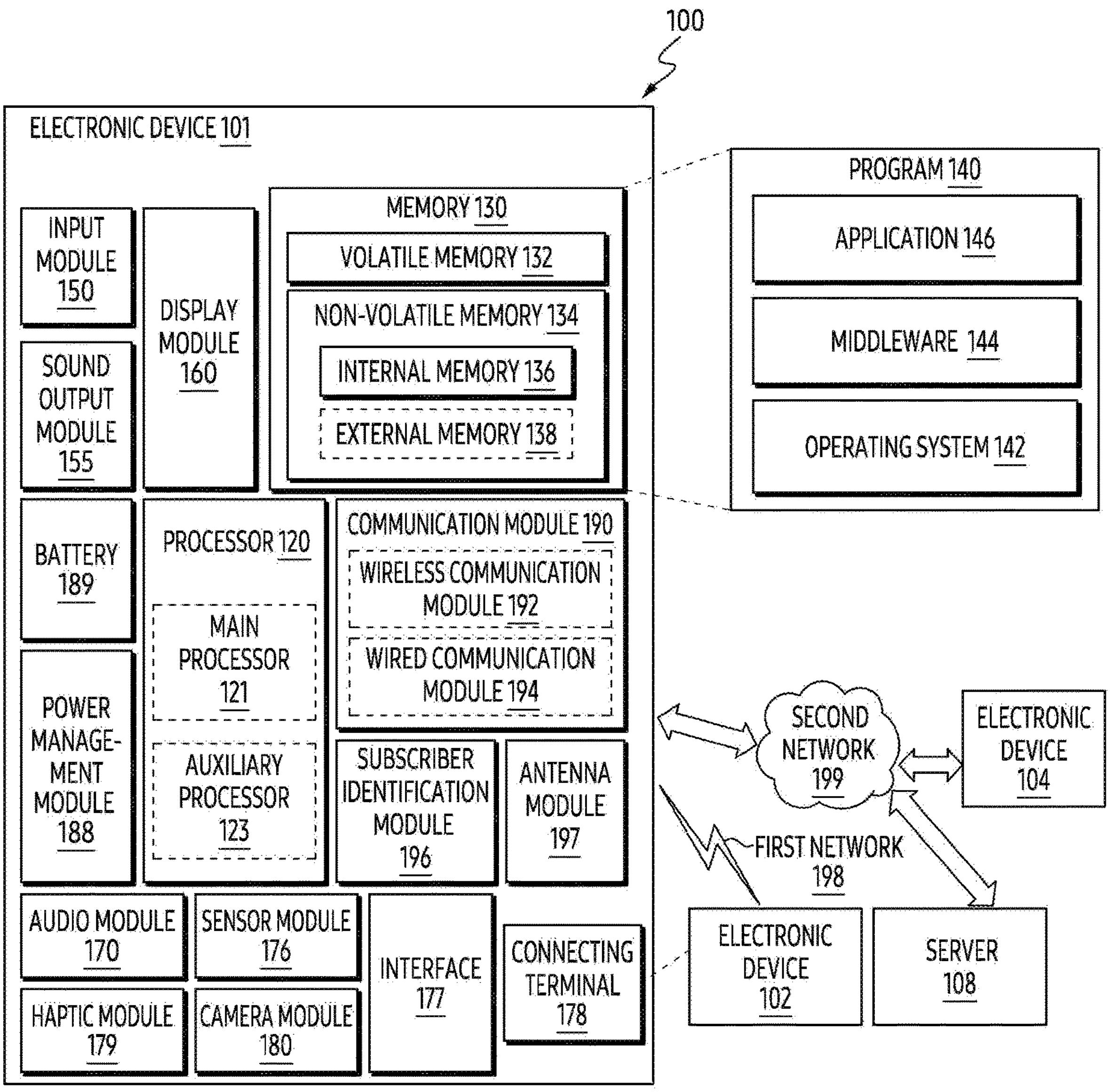
FIG. 1 is a block diagram of an electronic device in a network environment according to an embodiment.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

For example, the display of the display module 160 may be flexible. For example, the display may include a display region exposed to the outside of a housing of the electronic device 101 providing at least a portion of an outer surface of the electronic device. For example, because the display has flexibility, at least a portion of the display can be rolled into or slidable into the housing. For example, a size of the display region can be changed according to a size of the at least portion of the display rolled into or slid into the housing. For example, the electronic device 101 including the display can be in a plurality of states including a first state providing the display region having a first size and a second state providing the display region having a second size different form the first size. For example, the first state may be exemplified through descriptions of FIGS. 2A and 2B.

Figure 2A:
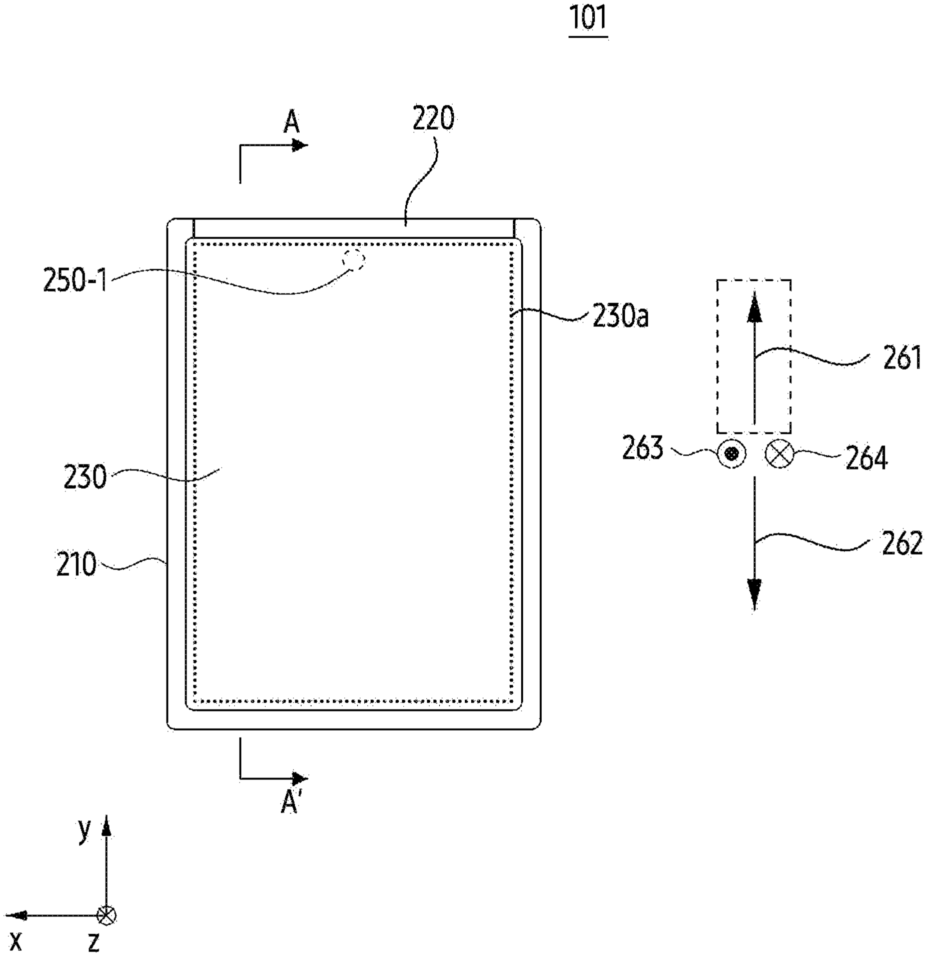
FIG. 2A illustrates an exemplary electronic device in a first state viewed in a z-axis direction.

FIG. 2A illustrates an exemplary electronic device in a first state viewed in a z-axis direction.

Referring to FIG. 2A, the electronic device 101 may include a first housing 210, a second housing 220 movable with respect to the first housing 210 in a first direction 261 parallel to a y-axis or in a second direction 262 parallel to the y-axis and opposite to the first direction 261, and a display 230 (e.g., the display).

For example, the electronic device 101 may be in the first state. For example, in the first state, the second housing 220 may be movable with respect to the first housing 210 in the first direction 261 among the first direction 261 and the second direction 262. For example, in the first state, the second housing 220 may not be movable in the second direction 262 with respect to the first housing 210.

For example, in the first state, the display 230 may provide a display area having the smallest size. For example, in the first state, the display area may correspond to the area **230*a*. For example, although not illustrated in FIG. 2A, in the first state, an area of a display 230 (e.g., an area 230*b* of FIG. 2C) different from the display area 230*a* may be included in the first housing 210. For example, in the first state, the area (e.g., the area 230*b* of FIG. 2C) may be covered by the first housing 210. For example, in the first state, the area may be rolled into the first housing 210. For example, in the first state, the area 230*a* may include a planar portion. However, it is not limited thereto. For example, the area 230*a*** may include, in the first state, the curved portion extending from the planar portion and positioned in an edge portion.

For example, the first state may be referred to as a slide-in state or a closed state in terms of at least a portion of the second housing 220 being positioned in the first housing 210. For example, the first state may be referred to as a contraction state in terms of providing the display area having the smallest size. However, it is not limited thereto.

For example, the second housing 220 may include a first image sensor 250-1 in the camera module 180, which is exposed through a part of the area **230*a* and faces a third direction 263 parallel to the z-axis. For example, although not illustrated in FIG. 2A, the second housing 220 may include one or more second image sensors in the camera module 180 exposed through the portion of the second housing 220 and facing in a fourth direction 264 parallel to the z-axis and opposite to the third direction 263. For example, the one or more second image sensors may be illustrated through the description of FIG. 2B**.

Figure 2B:
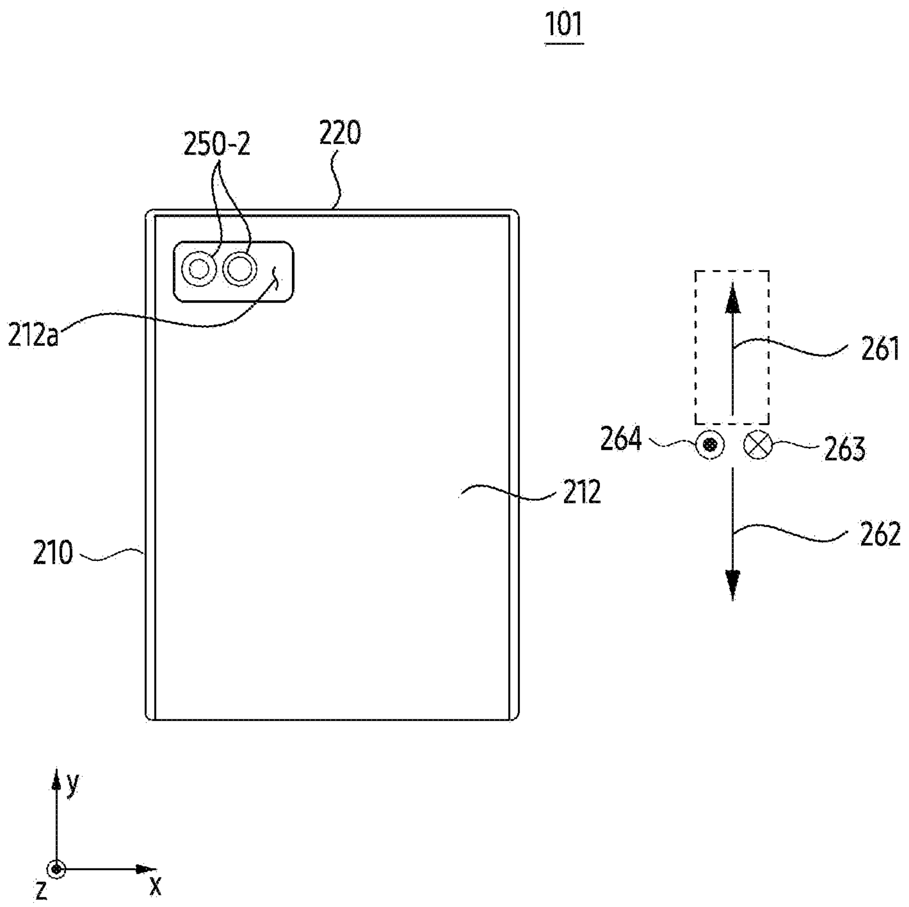
FIG. 2B illustrates an exemplary electronic device in a first state viewed in a −z axis direction.

FIG. 2B illustrates an exemplary electronic device in a first state viewed in a −z axis direction.

Referring to FIG. 2B, in the first state, one or more second image sensors 250-2 disposed in a second housing 220 may be positioned within a structure disposed in a first housing 210 for the one or more second image sensors 250-2. For example, light from the outside of an electronic device 101 may be received by the one or more second image sensors 250-2 through a structure in the first state. For example, since the one or more second image sensors 250-2 is positioned within the structure in the first state, the one or more second image sensors 250-2 may be exposed through the structure in the first state. For example, the structure may be implemented in various ways. For example, the structure may be an opening or a notch. For example, the structure may be an opening **212*a* in a first plate 212 of the first housing 210 surrounding at least a portion of the second housing 220. However, it is not limited thereto. For example, in the first state, the one or more second image sensors 250-2 included in the second housing 220 may be covered by the first plate 212 of the first housing 210**.

The first state may be changed to the second state.

For example, the first state (or the second state) may be changed to the second state (or the first state) through intermediate states between the first state and the second state.

For example, the first state (or the second state) may be changed to the second state (or the first state) based on a user input. For example, the first state (or the second state) may be changed to the second state (or the first state) in response to a user input for a physical button exposed through a portion of the first housing 210 or the portion of the second housing 220. For example, the first state (or the second state) may be changed to the second state (or the first state) in response to a touch input for an executable object displayed in the display area. For example, the first state (or the second state) may be changed to the second state (or the first state) in response to a touch input having a contact point on the display area and having press intensity more than a reference intensity. For example, the first state (or the second state) may be changed to the second state (or the first state) in response to a voice input received through the microphone of the electronic device 101. For example, the first state (or the second state) may be changed to the second state (or the first state) in response to an external force applied to the first housing 210 and/or the second housing 220 to move the second housing 220 with respect to the first housing 210. For example, the first state (or the second state) may be changed to the second state (or the first state) in response to a user input identified by an external electronic device (e.g., ear-buds or smart watch) connected to the electronic device 101. However, it is not limited thereto.

Figure 2C:
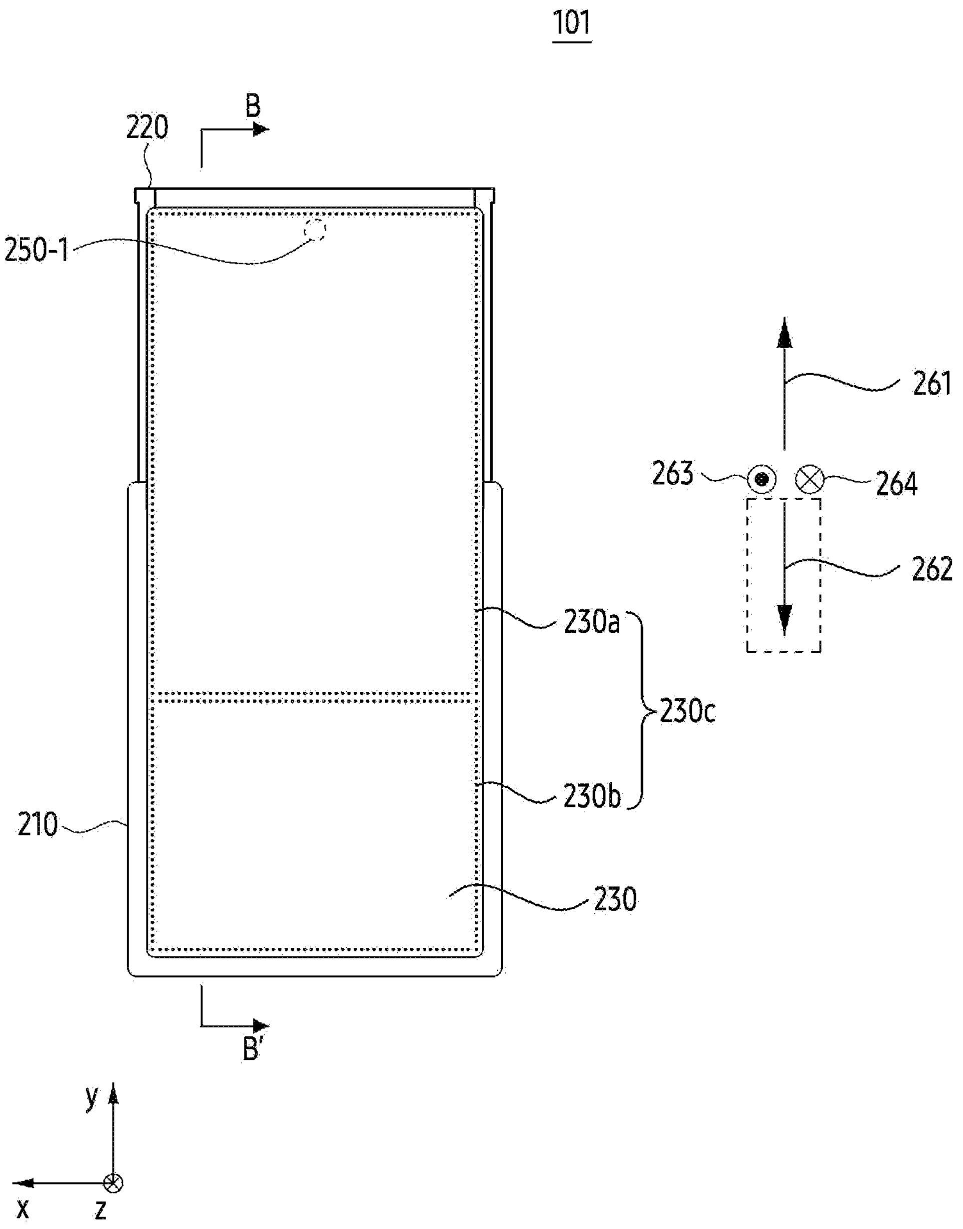
FIG. 2C illustrates an exemplary electronic device in a second state viewed in a z-axis direction.
Figure 2D:
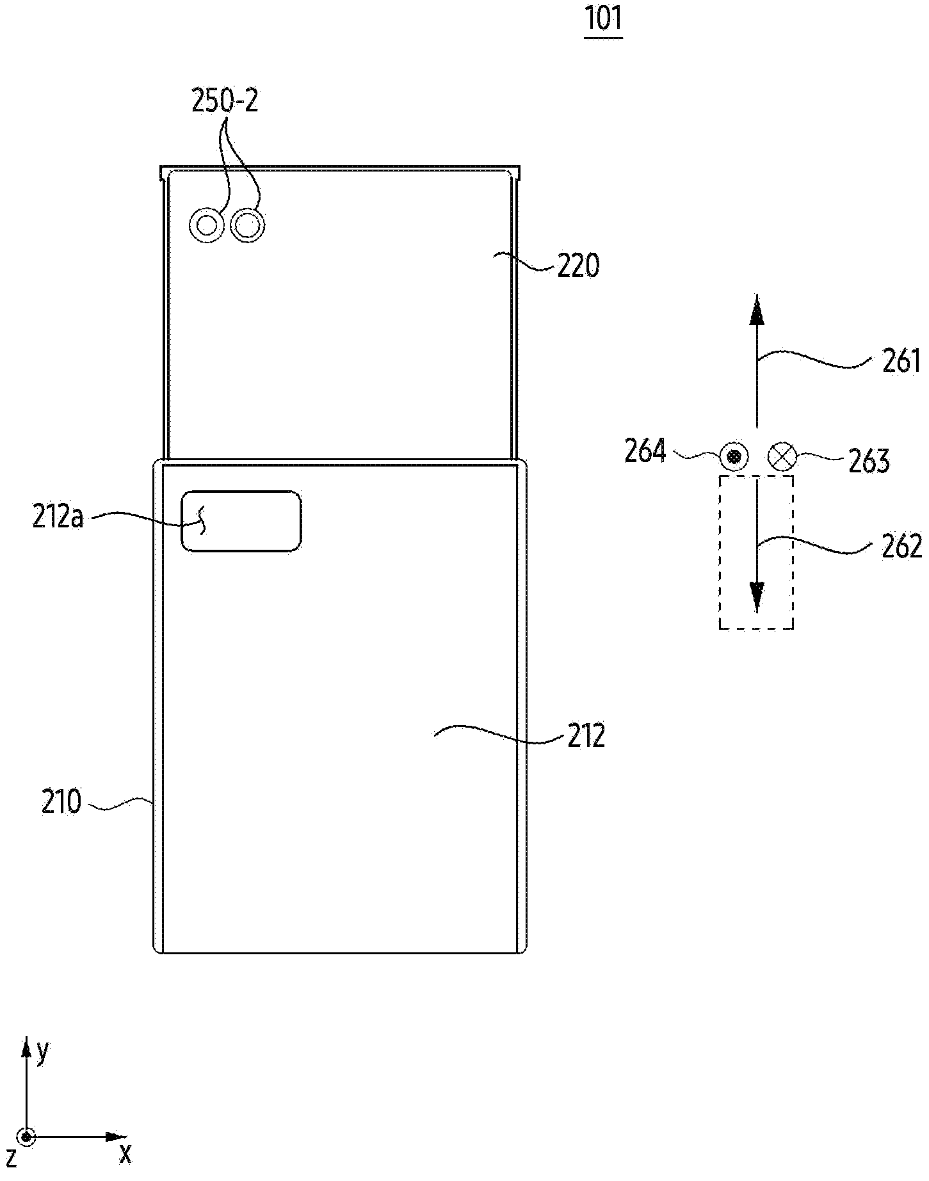
FIG. 2D illustrates an exemplary electronic device in a second state viewed in a −z axis direction.

The second state may be exemplified through descriptions of FIGS. 2C and 2D.

FIG. 2C illustrates an exemplary electronic device in a second state viewed in a z-axis direction.

Referring to FIG. 2C, an electronic device 101 may be in the second state. For example, in the second state, a second housing 220 may be movable with respect to a first housing 210 in the second direction 262 among the first direction 261 and the second direction 262. For example, in the second state, the second housing 220 may not be movable in the first direction 261 with respect to the first housing 210.

For example, in the second state, a display 230 may provide a display area having the largest size. For example, in the second state, the display area may correspond to an area 230*c* including an area 230*a* and an area 230*b*. For example, the area 230*b* included in the first housing 210 in a first state may be exposed in the second state. For example, in the second state, the area 230*a* may include a planar portion. However, it is not limited thereto. For example, the area 230*a* may include a curved portion extending from the planar portion and positioned in an edge portion. For example, in the second state, the area 230*b* may include the planar portion among the planar portion and the curved portion. However, it is not limited thereto. For example, the area 230*b* may include the curved portion extending from the planar portion of area 230*b* and positioned in the edge portion.

For example, the second state may be referred to as a slide-out state or an open state with respect to the first state, in terms of increasing at least a portion of the second housing 220 disposed outside the first housing 210. For example, the second state may be referred to as an extended state in terms of providing the display area having the largest size. However, it is not limited thereto.

For example, when the state of the electronic device 101 changes from the first state to the second state, a first image sensor 250-1 facing a third direction 263 may be moved together with the area 230*a* according to the movement of the second housing 220 in the first direction 261. For example, although not illustrated in FIG. 2C, one or more second image sensors 250-2 facing a fourth direction 264 may be moved according to the movement of the second housing 220 in the first direction 261 when the state of the electronic device 101 is changed from the first state to the second state. For example, the relative positional relationship between the one or more second image sensors 250-2 and the structure exemplified through the description of FIG. 2B may be changed according to the movement of the one or more second image sensors 250-2. For example, the change of the relative positional relationship may be exemplified through FIG. 2D.

FIG. 2D illustrates an exemplary electronic device in a second state viewed in a −z axis direction.

Referring to FIG. 2D, within the second state, the one or more second image sensors 250-2 may be located outside the structure. For example, the structure may include the opening 212*a*. For example, within the second state, the one or more second image sensors 250-2 may be located outside the opening 212*a* in the first plate 212. For example, the one or more second image sensors 250-2 may be exposed through the opening 212*a* within the first state. For example, since the one or more second image sensors 250-2 are located outside the first housing 210 within the second state, the one or more second image sensors 250-2 may be exposed within the second state. For example, since the one or more second image sensors 250-2 are located outside the structure within the second state, the relative positional relationship within the second state may be different from the relative positional relationship within the first state.

For example, when the electronic device 101 does not include the structure, such as the opening 212*a*, the one or more second image sensors 250-2 may be exposed within the second state among the first state and the second state.

Although not illustrated in FIGS. 2A, 2B, 2C, and 2D, the electronic device 101 may be in an intermediate state between the first state and the second state. For example, the size of the display area in the intermediate state may be larger than the size of the display area in the first state and smaller than the size of the display area in the second state. For example, the display area in the intermediate state may correspond to an area including a portion of an area 230*a* and an area 230*b*. For example, in the intermediate state, a portion of the area 230*b* may be exposed, and another portion (or remaining portion) of the area 230*b* may be covered by first housing 210 or may be rolled into the first housing 210. However, it is not limited thereto.

The electronic device 101 may include structures to move the second housing (e.g., the second housing 220) of the electronic device 101 with respect to the first housing (e.g., the first housing 210 of FIG. 2A) of the electronic device 101. For example, the structures can be illustrated through descriptions of FIGS. 3A and 3B.

Figure 3A:
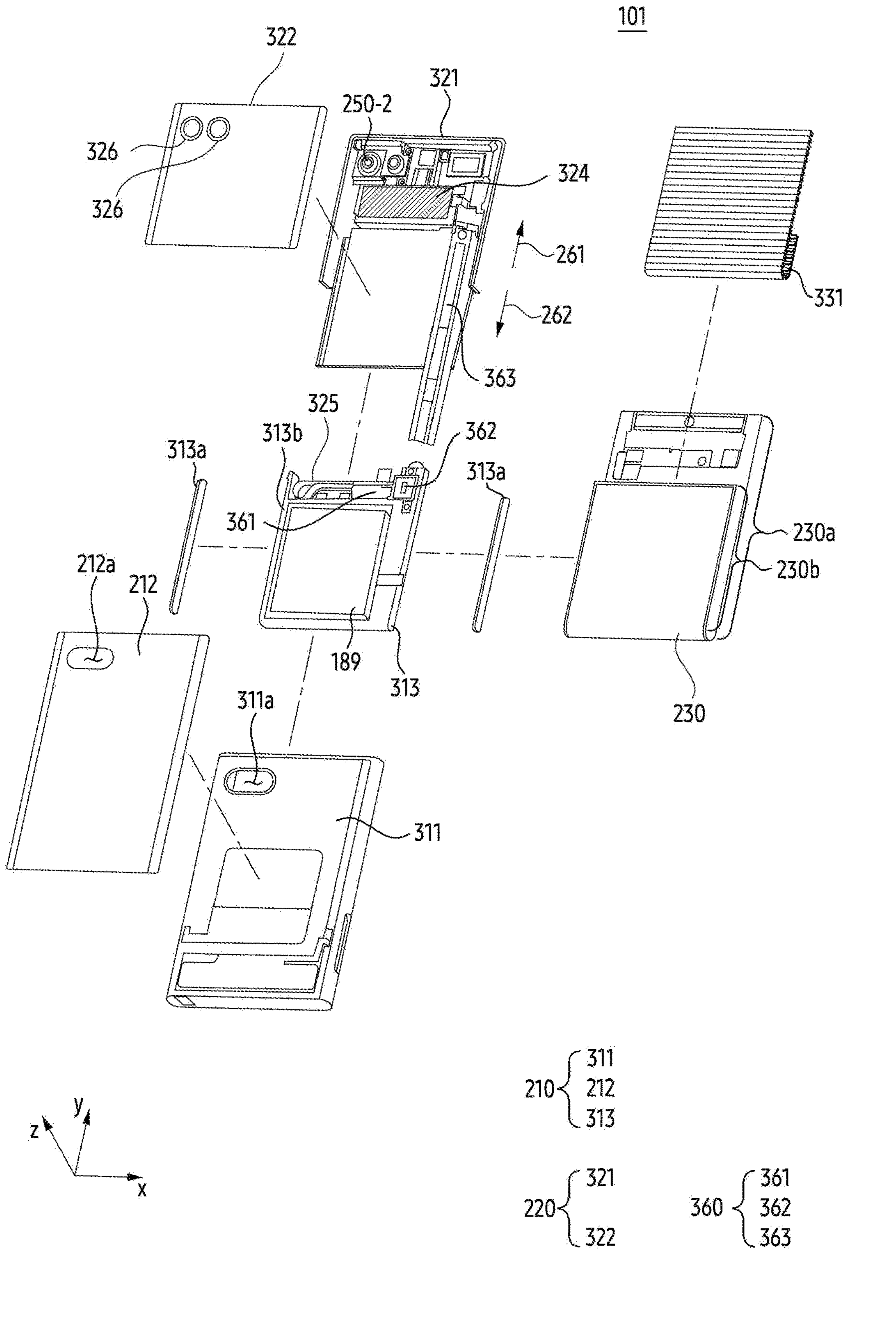
FIGS. 3A and 3B are an exploded perspective view of an exemplary electronic device.
Figure 3B:
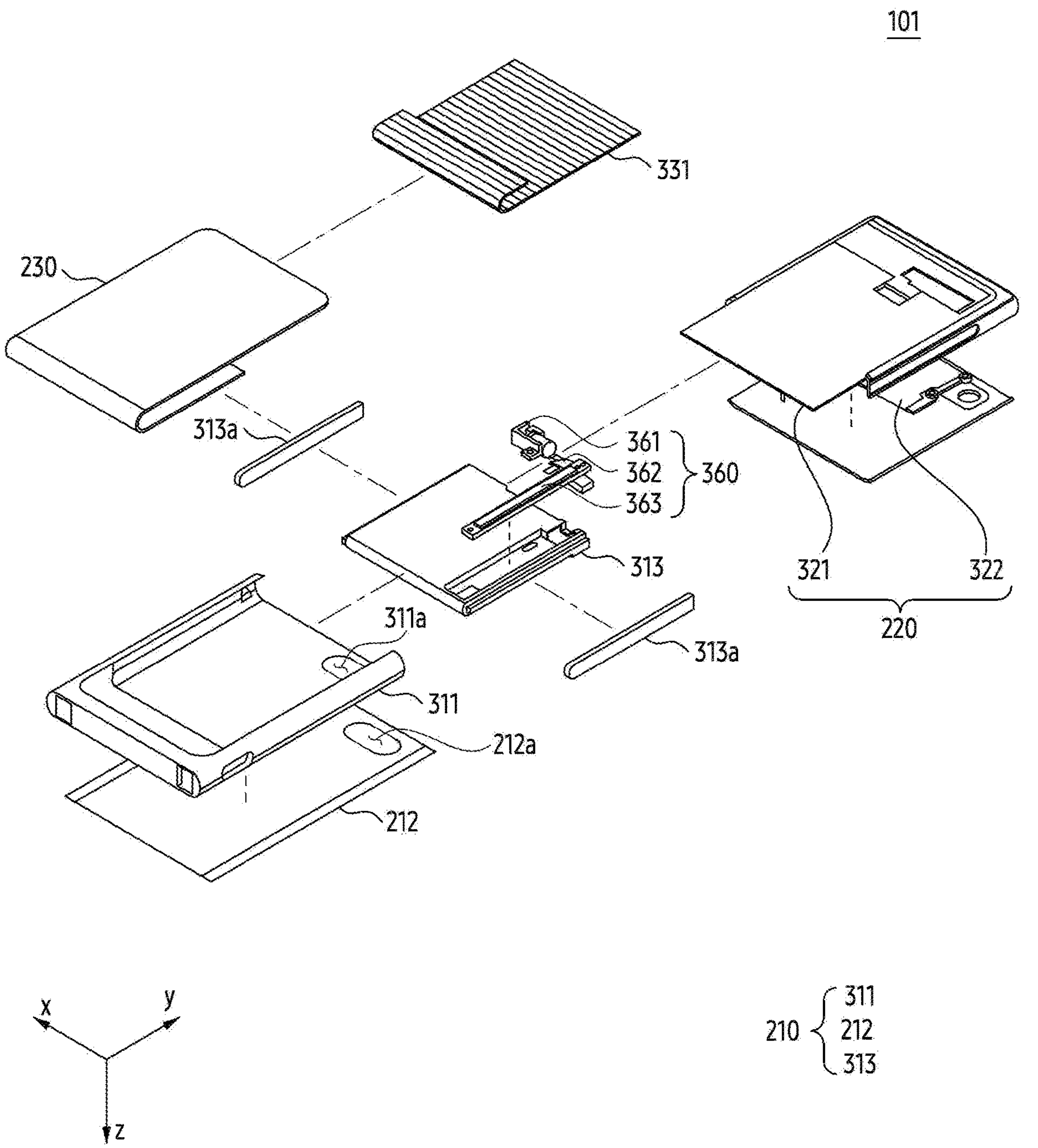

FIGS. 3A and 3B are an exploded perspective view of an exemplary electronic device.

Referring to FIGS. 3A and 3B, an electronic device 101 may include a first housing 210, a second housing 220, a display 230, and a driving unit 360.

For example, the first housing 210 may include a first cover 311, a first plate 212, and a frame 313.

For example, the first cover 311 may at least partially form a side surface part of the outer surface of the electronic device 101. For example, the first cover 311 may include an opening 311*a* for one or more second image sensors 250-2. For example, the first cover 311 may include a surface supporting the first plate 212. For example, the first cover 311 may be coupled to the first plate 212. For example, the first cover 311 may include a frame 313. For example, the first cover 311 may be coupled to the frame 313.

For example, the first plate 212 may at least partially form the rear surface portion of the outer surface. For example, the first plate 212 may include an opening 212*a* for the one or more second image sensors 250-2. For example, the first plate 212 may be disposed on the surface of the first cover 311. For example, the opening 212*a* may be aligned with the opening 311*a*.

For example, the frame 313 may be at least partially surrounded by the first cover 311.

For example, the frame 313 may be at least partially surrounded by the display 230. For example, the frame 313 is at least partially surrounded by the display 230, but the position of the frame 313 may be maintained independently of the movement of the display 230. For example, the frame 313 may be arranged in relation to at least some of the components of the display 230. For example, the frame 313 may include rails 313*a* that provide (or guide) a path of the movement of at least one component of the display 230.

For example, the frame 313 may be coupled to at least one component of the electronic device 101. For example, the frame 313 may support the battery 189. For example, the battery 189 may be supported through a recess or a hole in the surface 313*b* of the frame 313. For example, although not explicitly illustrated in FIGS. 3A and 3B, one end of an FPCB 325 may be connected to a PCB 324 through at least one connector. For example, another end of the FPCB 325 may be connected to another PCB (not shown in FIGS. 3A and 3B) on the frame 313 through at least one connector. For example, the PCB 324 may be electrically connected to another PCB (not shown in FIGS. 3A and 3B) that supplies power to the motor 361 through the FPCB 325.

For example, the frame 313 may be coupled to at least one structure of the electronic device 101 for a plurality of states including the first state and the second state. For example, the frame 313 may fasten the motor 361 of the driving unit 360.

For example, the second housing 220 may include a second cover 321 and a second plate 322.

For example, the second plate 321 may be at least partially surrounded by the display 230. For example, the second plate 321 may be coupled to at least a portion of an area 230*a* of the display 230 surrounding the second plate 321, unlike the frame 313, so that the display 230 is moved along the second housing 220 that is moved with respect to the first housing 210.

For example, the second plate 321 may be coupled to at least one component of the electronic device 101. For example, the second plate 321 may be coupled to the printed circuit board (PCB) 324 including components of the electronic device 101. For example, the PCB 324 may include a processor 120 (not illustrated in FIGS. 3A and 3B). For example, the second plate 321 may include the one or more second image sensors 250-2.

For example, the second plate 321 may be coupled to the at least one structure of the electronic device 101 for the plurality of states including the first state and the second state. For example, the second plate 321 may fasten a rack gear 363 of the driving unit 360.

For example, the second plate 321 may be coupled to the second plate 322.

For example, the second plate 322 may be coupled to the second plate 321 to protect at least one component of the electronic device 101 coupled in the second plate 321 and/or at least one structure of the electronic device 101 coupled in the second plate 321. For example, the second plate 322 may include a structure for the at least one component. For example, the second plate 322 may include one or more openings 326 for the one or more second image sensors 250-2. For example, the one or more openings 326 may be aligned with the one or more second image sensors 250-2 disposed on the second plate 321. For example, the size of each of the one or more openings 326 may correspond to the size of each of the one or more second image sensors 250-2.

For example, the electronic device 101 may include a support member 331 for supporting at least a portion of the display 230. For example, the support member 331 may include a plurality of bars. For example, the plurality of bars may be coupled to each other. The support member 331 may support the area 230*b* of the display 230.

For example, the driving unit 360 may include the motor 361, a pinion gear 362, and the rack gear 363.

For example, the motor 361 may operate based on power from the battery 189. For example, the power may be provided to the motor 361 in response to the predefined user input.

For example, the pinion gear 362 may be coupled to the motor 361 through a shaft. For example, the pinion gear 362 may be rotated based on the operation of the motor 361 transmitted through the shaft.

For example, the rack gear 363 may be arranged in relation to the pinion gear 362. For example, teeth of the rack gear 363 may be engaged with teeth of the pinion gear 362. For example, the rack gear 363 may move in a first direction 261 or a second direction 262 according to the rotation of the pinion gear 362. For example, the second housing 220 may be moved in the first direction 261 and the second direction 262 by the rack gear 363 that is moved according to the rotation of the pinion gear 362 due to the operation of the motor 361. For example, the first state of the electronic device 101 may be changed to a state different from the first state (e.g., the one or more intermediate states or the second state) through the movement of the second housing 220 in the first direction 261. For example, the second state of the electronic device 101 may be changed to a state (e.g., the one or more intermediate states or the first state) different from the second state through the movement of the second housing 220 in the second direction 262. For example, changing the first state to the second state by the driving unit 360 and changing the second state to the first state by the driving unit 360 may be exemplified through FIGS. 4A and 4B.

Figure 4A:
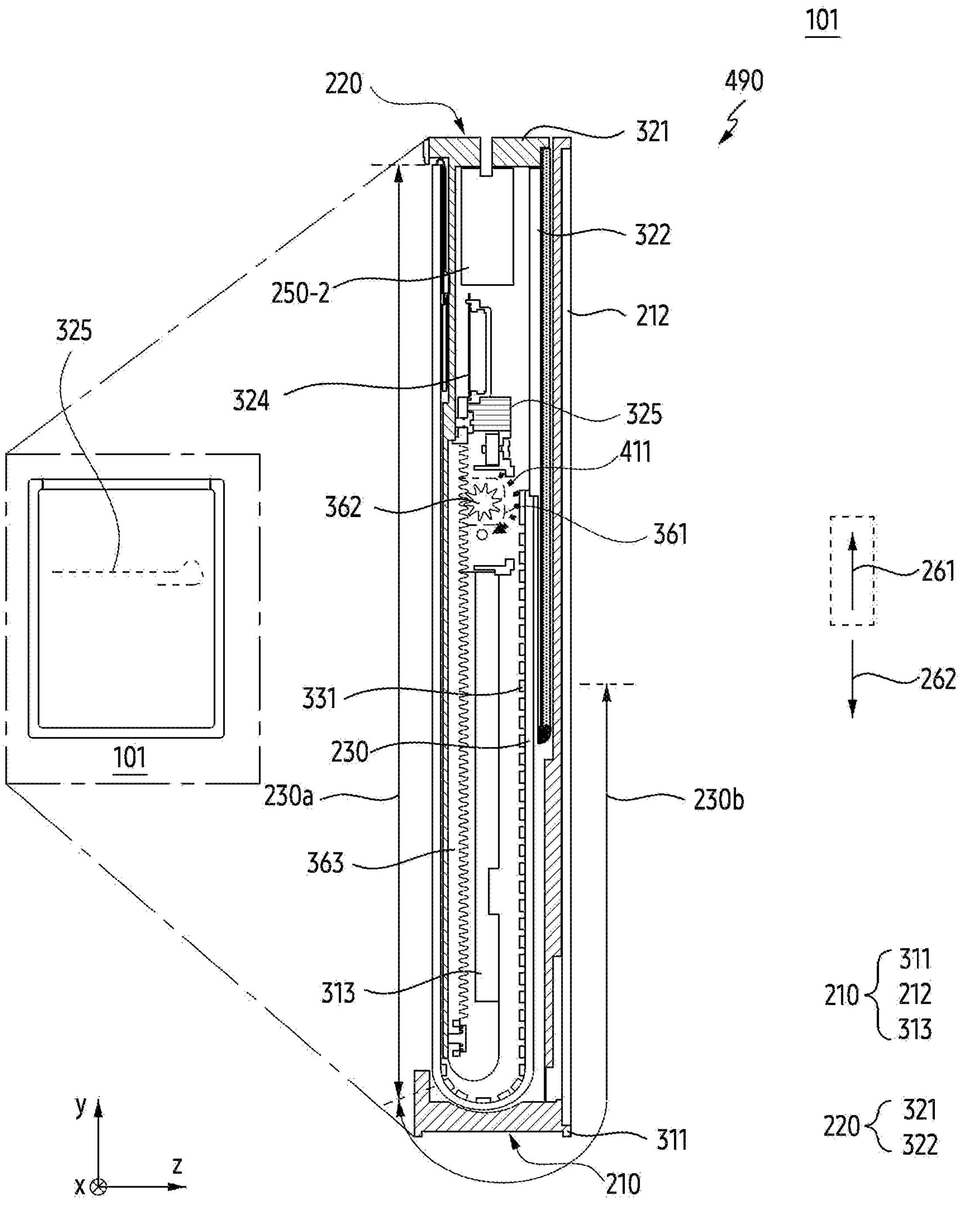
FIG. 4A is a cross-sectional view of an exemplary electronic device in a first state.
Figure 4B:
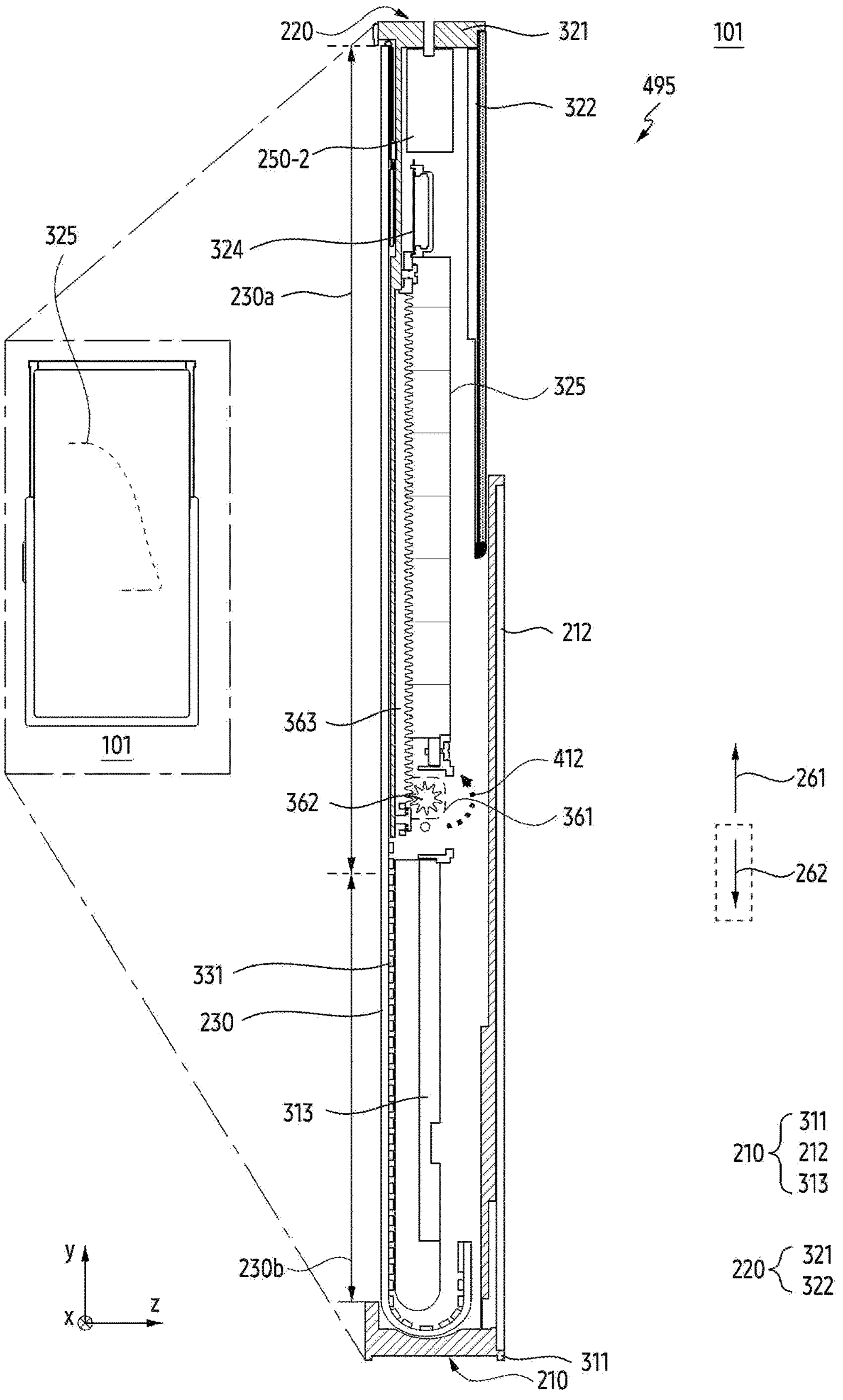
FIG. 4B is a cross-sectional view of an exemplary electronic device in a second state.

FIG. 4A is a cross-sectional view of an exemplary electronic device 101 in a first state. FIG. 4B is a cross-sectional view of an exemplary electronic device 101 in a second state.

Referring to FIGS. 4A and 4B, a motor 361 may be operated based at least partially on a user input received in a state 490, which is the first state. For example, a pinion gear 362 may rotate in a first rotation direction 411 based at least partially on the operation of the motor 361. For example, a rack gear 363 may be moved in a first direction 261, based at least partially on the rotation of the pinion gear 362 in the first rotation direction 411. For example, since a second plate 321 in a second housing 220 fastens the rack gear 363, the second housing 220 may be moved in the first direction 261 based at least partially on the movement of the rack gear 363 in the first direction 261. For example, since the second plate 321 in the second housing 220 is coupled to at least a portion of an area 230*a* of a display 230 and fastens the rack gear 363, the display 230 may be moved based at least partially on the movement of the rack gear 363 in the first direction 261. For example, the display 230 may be moved along rails 313*a*. For example, the shape of at least some of the plurality of bars of the support member 331 of the display 230 may be changed when the state 490 is changed to a second state 495.

For example, an area 230*b* of the display 230 may be moved according to the movement of the display 230. For example, when the state 490 is changed to the state 495 according to the user input, the area 230*b* may be moved through a space between a first cover 311 and a frame 313. For example, the area 230*b* in the state 495 may be exposed, unlike the area 230*b* rolled into the space in the state 490.

For example, since the second plate 321 in the second housing 220 is coupled to a PCB 324 connected to another end of a FPCB 325 and fastens the rack gear 363, the FPCB 325, the shape of the FPCB 325 may be changed when the state 490 is changed to the state 495.

The motor 361 may be operated based at least partially on the user input received in the state 495. For example, the pinion gear 362 may be rotated in a second rotation direction 412 based at least partially on the operation of the motor 361. For example, the rack gear 363 may be moved in a second direction 262, based at least partially on the rotation of the pinion gear 362 in the second rotation direction 412. For example, since the second plate 321 in the second housing 220 fastens the rack gear 363, the second housing 220 may be moved in the second direction 262 based at least partially on the movement of the rack gear 363 in the second direction 262. For example, since the second plate 321 in the second housing 220 is coupled to at least a portion of the area 230*a* of the display 230 and fastens the rack gear 363, the display 230 may be moved based at least partially on the movement of the rack gear 363 in the second direction 262. For example, the display 230 may be moved along the rails 313*a*. For example, the shape of at least some of the plurality of bars of the support member 331 of the display 230 may be changed when the state 495 is changed to the state 490. The support member 331 may be moved with respect to the first housing 210. The support member 331 stored inside the first housing 210 within the state 490 may be located between the first cover 311 and the frame 313. The display 230 may be moved with respect to the first housing 210 according to the movement of the support member 331.

For example, the area 230*b* of the display 230 may be moved according to the movement of the display 230. For example, the area 230*b* may be moved through the space between the first cover 311 and the frame 313 when the state 495 is changed to the state 490 according to the predefined user input. For example, the area 230*b* in the state 490 may be rolled into the space, unlike the area 230*b* exposed in the state 495.

For example, since the second plate 321 in the second housing 220 is coupled to the PCB 324 connected to another end of the FPCB 325 and fastens the rack gear 363, the shape of the FPCB 325 may be changed when the state 495 is changed to the state 490.

FIGS. 2A to 4B illustrate the electronic device 101 in which the height of the display area is changed and the width of the display area is maintained when the first state (or the second state) is changed to the second state (or the first state) in the portrait mode, but this is for convenience of description. For example, the electronic device 101 may be implemented that the height of the display area is maintained and the width of the display area is changed, when the first state (or the second state) is changed to the second state (or the first state) in the portrait mode.

Figure 5:
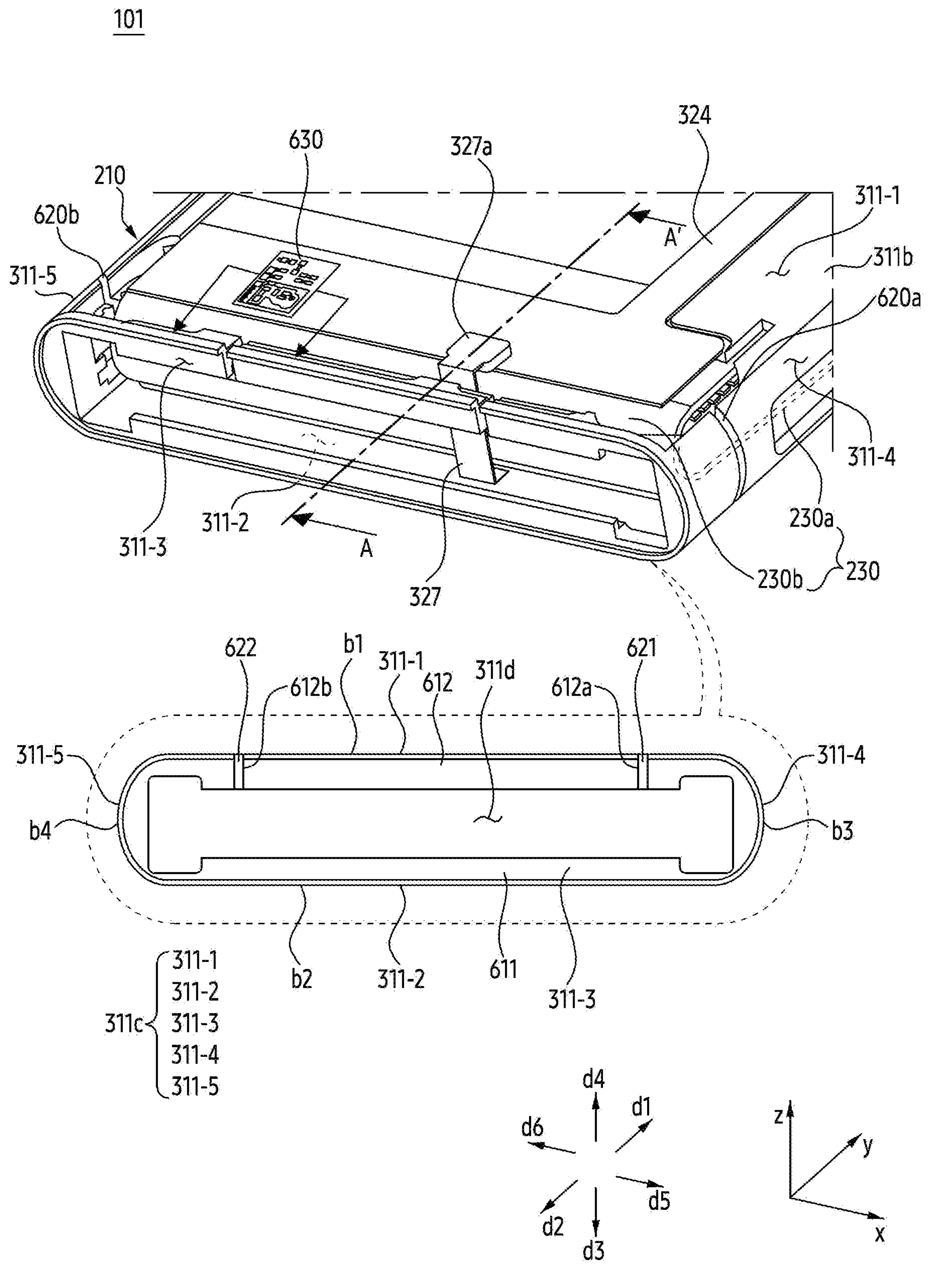
FIG. 5 is a perspective view of an exemplary electronic device.
Figure 6:
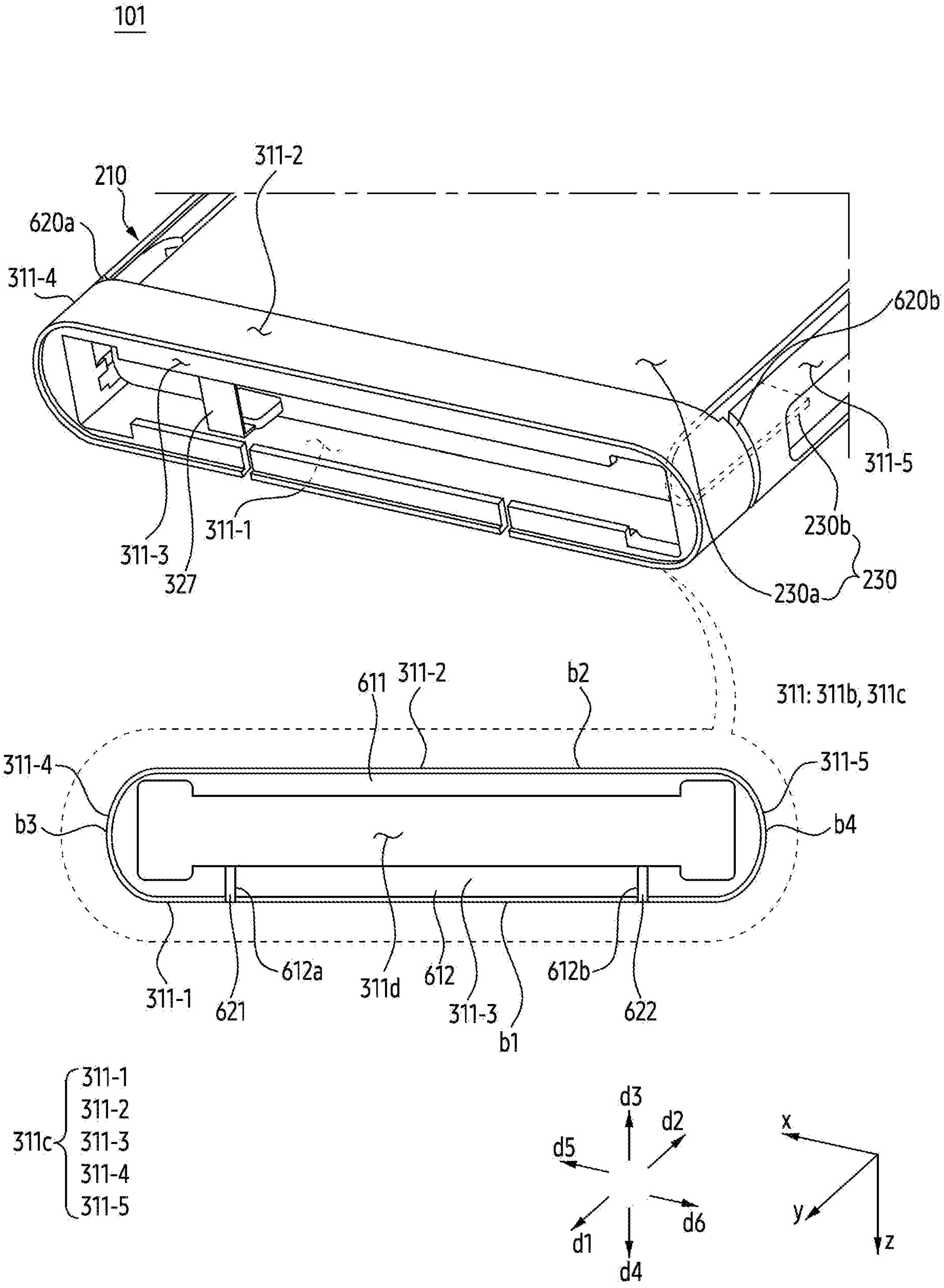
FIG. 6 is a perspective view of an exemplary electronic device of FIG. 5 viewed from another direction.
Figure 7A:
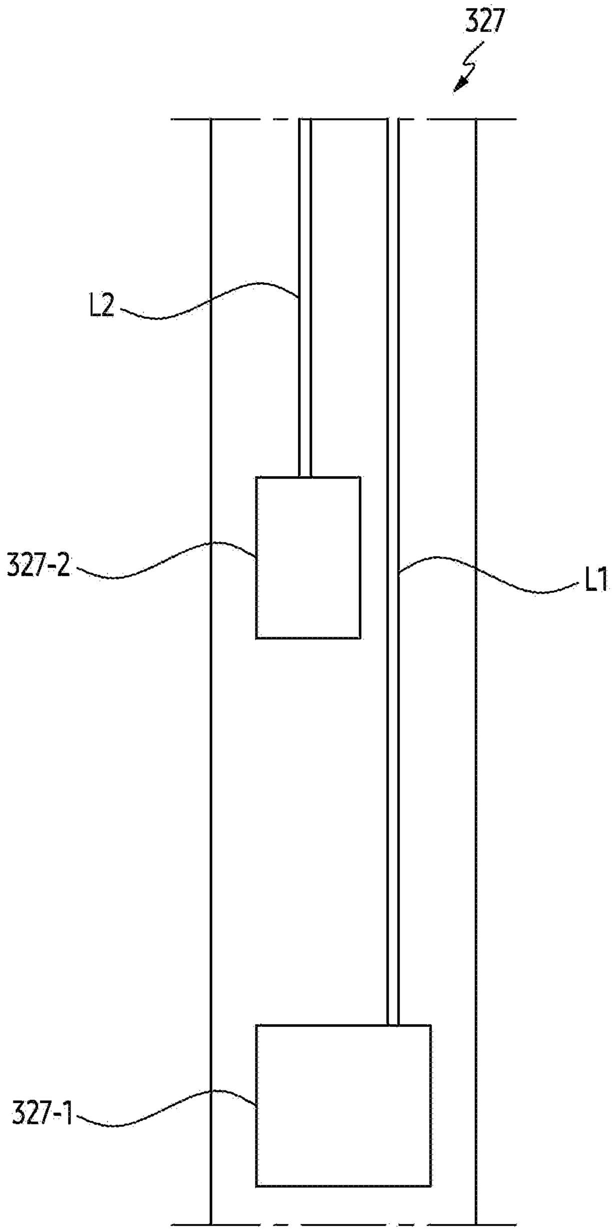
FIGS. 7A and 7B illustrate a second printed circuit board and a switch of an exemplary electronic device.
Figure 7B:
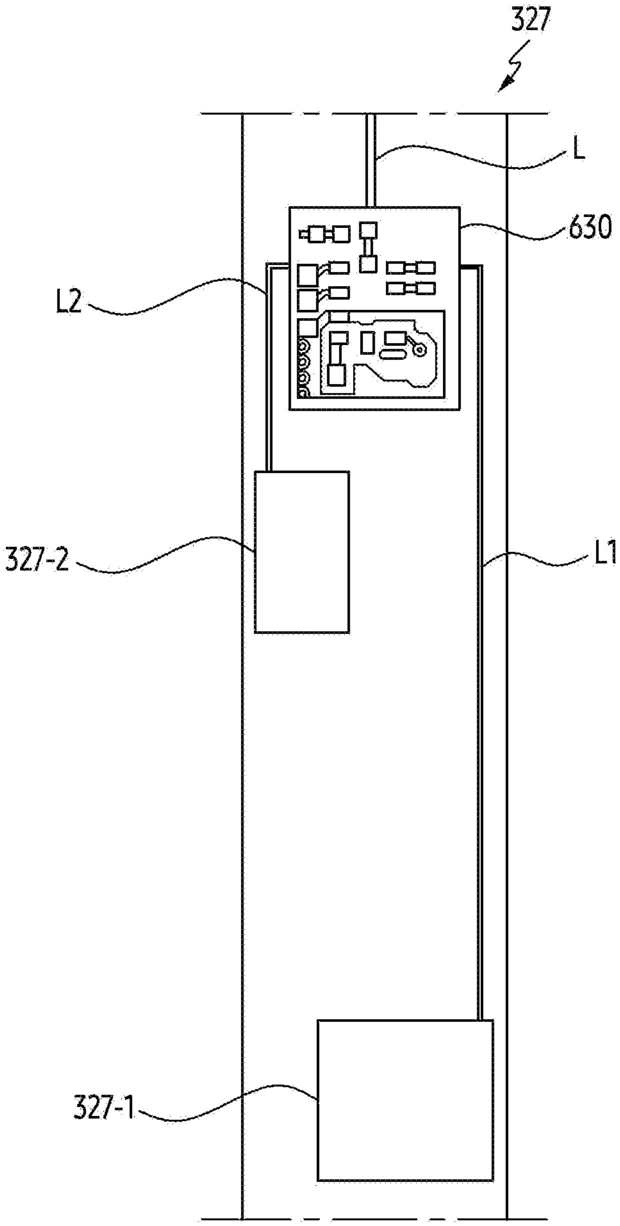
Figure 7C:
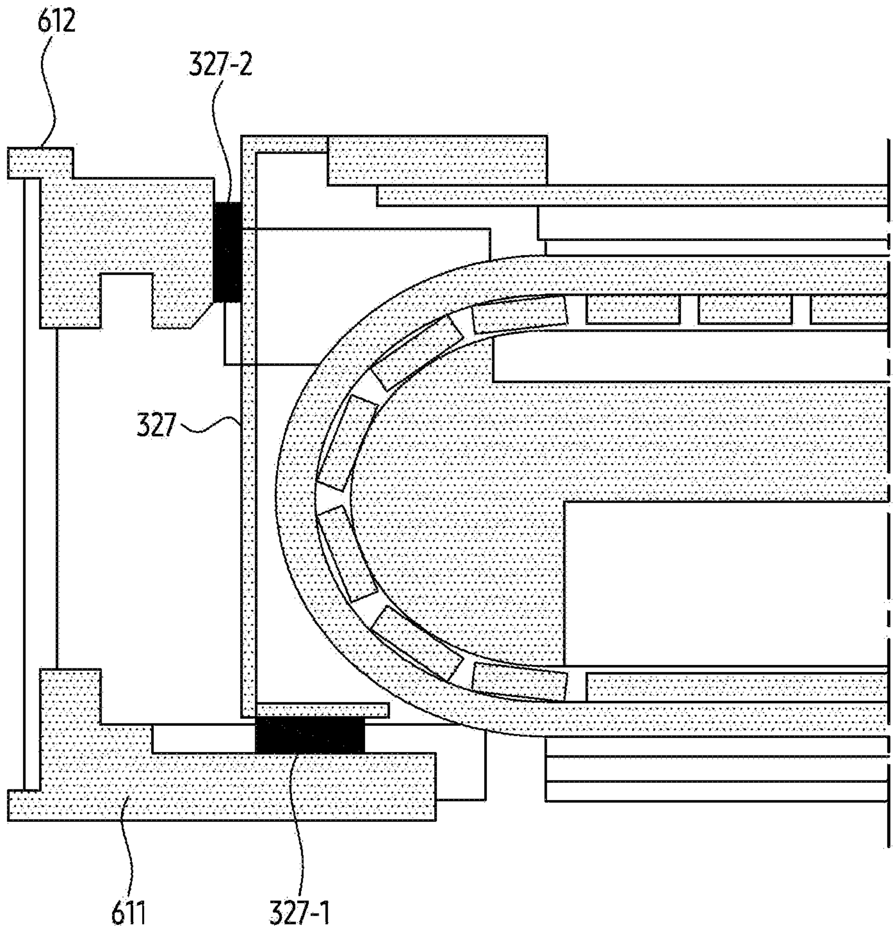
FIGS. 7C, 7D, and 7E illustrate an example of a cross-section in which an exemplary electronic device is cut along A-A' of FIG. 6.
Figure 7D:
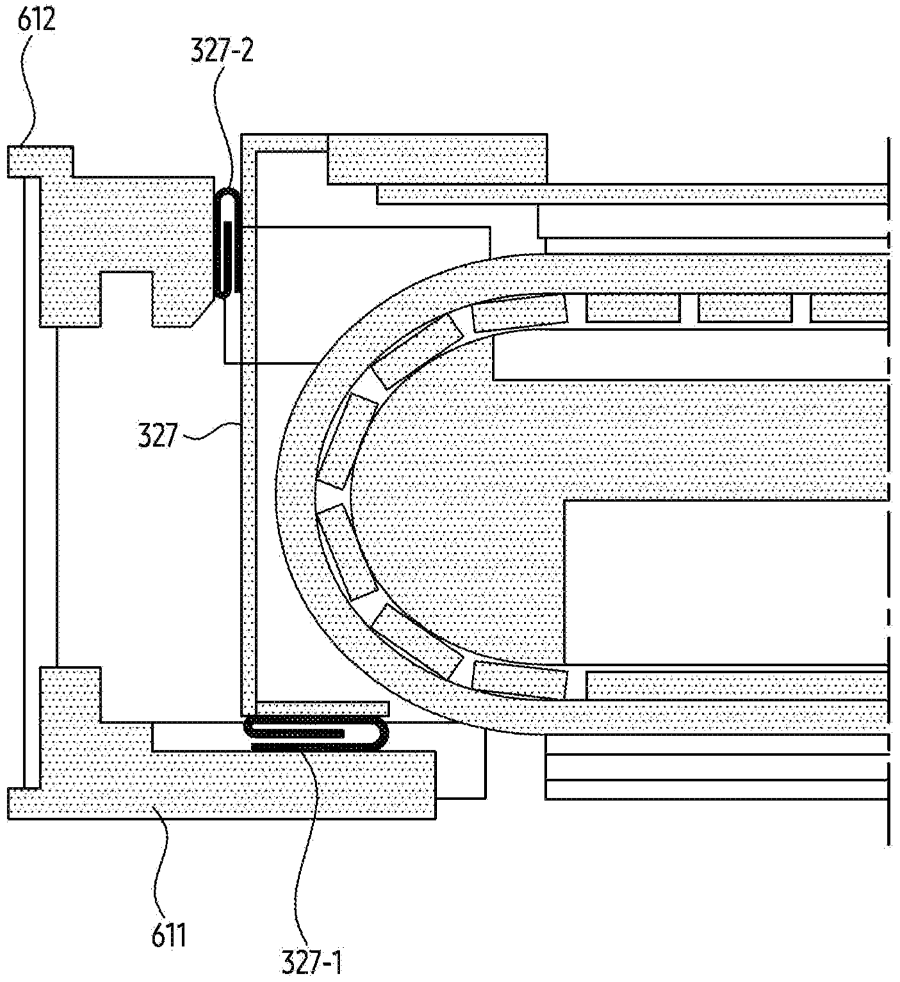
Figure 7E:
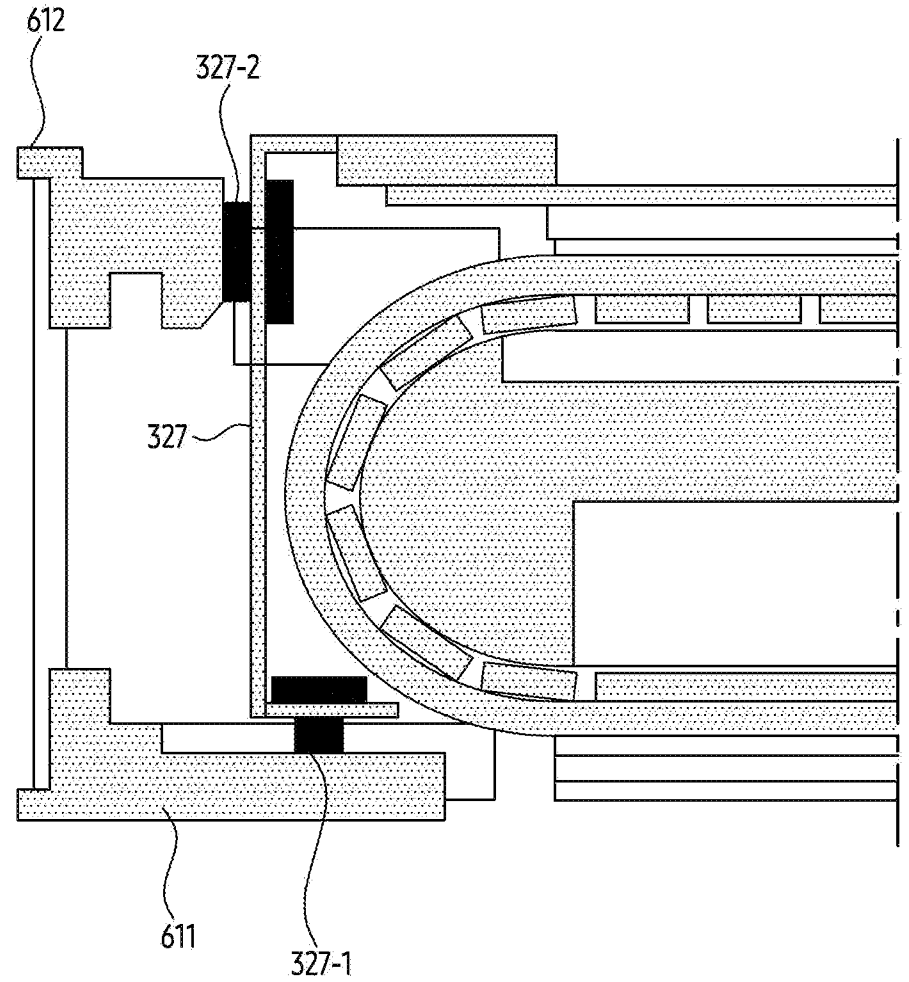

FIG. 5 is a perspective view of an exemplary electronic device. FIG. 6 is a perspective view of an exemplary electronic device of FIG. 5 viewed from another direction. FIGS. 7A and 7B illustrate a second printed circuit board 327 and a switch circuit 630 of an exemplary electronic device 101. FIGS. 7C, 7D, and 7E illustrate an example of a cross-section in which an exemplary electronic device 101 is cut along A-A' of FIG. 6.

Referring to FIGS. 5 and 6, the electronic device 101 may include a first housing 210, a second housing (e.g., the second housing 220 in FIG. 2A), a display 230 and at least one processor (e.g., the processor 120 in FIG. 1, and/or a communication processor).

The second housing 220 may be movably coupled to the first housing 210. The second housing 220 may be moved in a first direction D1 (e.g., +y direction) or in a second direction D2 (e.g., −y direction) opposite to the first direction D1, with respect to the first housing 210. For example, the electronic device 101 may be in a plurality of states in which includes a first state in which the second housing 220 is movable in the first direction D1, among the first direction D1 and the second direction D2, and a second state in which the second housing 220 is movable in the second direction D2, among the first direction D1 and the second direction D2.

The display 230 may have flexibility. For example, at least a portion of the display 230 may be rollable into the housing or slidable into the housing. The size of the display area of the display 230 may be changed based on the movement of the second housing 220 with respect to the first housing 210.

The display 230 may include a first area 230*a* and a second area 230*b*. For example, the first area 230*a* may be referred to as an area 230*a* of FIG. 2C, and the second area 230*b* may be referred to as an area 230*b* of FIG. 2C. The first area 230*a* may be referred to as a part of the display area 230 that may be viewable from the outside of the electronic device 101, independently of a state of the electronic device 101. For example, the first area 230*a* may be a display area of the display 230 that may be viewable in a direction (e.g., the third direction d3) in which the display area of the display 230 faces when a state of the electronic device 101 is in the first state.

The second area 230*b* may extend from the first area 230*a*. The second area 230*b* may be exposed to the outside according to the second housing 220 moved in the first direction D1, and may be rolled into the first housing 210 as the second housing 220 moves in the second direction D2. For example, since the second area 230*b* is disposed within the first housing 210 and/or the second housing 220 within the first state, it may not be viewable from the outside of the electronic device 101.

At least one processor may be referred to the processor 120 of FIG. 1 and/or the communication processor. However, it is not limited thereto. The at least one processor may be configured to communicate with an external electronic device. For example, the at least one processor may be configured to transmit and/or receive a communication signal to an external electronic device through an antenna.

The first housing 210 may include a side member 311*c*, which forms at least a part of the outer surface of the electronic device 101. The side member 311*c* may include a first surface 311-1, a second surface 311-2 opposite to the first surface 311-1, and side surfaces (e.g., a third surface 311-3, a fourth surface 311-4, a fifth surface 311-5) between the first surface 311-1 and the second surface 311-2. The first surface 311-1 may face a fourth direction D4 (e.g., +z direction) opposite to a third direction D3 (e.g., −z direction) in which the first area 230*a* of the display 230 faces. The second surface 311-2 may face the third direction D3. The second surface 311-2 may extend from the third surface 311-3 toward the first direction dl to cover a part of the display 230.

The side surfaces may include a third surface 311-3 facing the second direction D2, a fourth surface 311-4 facing a fifth direction D5 (e.g., the +x direction) perpendicular to the second direction D2, and a fifth surface 311-5 facing a sixth direction D6 (e.g., a −x direction) opposite to the fifth direction D5. The side member 311*c* may form the second surface 311-2, the third surface 311-3, the fourth surface 311-4, and the fifth surface 311-5.

The third surface 311-3 may include a first boundary b1, a second boundary b2, a third boundary b3, and a fourth boundary b4. The first boundary b1 may be a boundary in which the first surface 311-1 and the third surface 311-3 are in contact with each other. The first boundary b1 may form a boundary in the fourth direction D4 of the third surface 311-3. The second boundary b2 may be opposite to the first boundary b1. The second boundary b2 may form a boundary in the third direction D3 of the third surface 311-3. The third boundary b3 may be located between the first boundary b1 and the second boundary b2 in the fifth direction D5 perpendicular to the second direction D2. The third boundary b3 may form a boundary in the fifth direction D5 of the third surface 311-3. The fourth boundary b4 may be located in the sixth direction D6 opposite to the fifth direction D5. The fourth boundary b4 may form a boundary in the sixth direction D6 of the third surface 311-3.

The side member 311*c* may include a first conductive portion 611 and a second conductive portion 612 disposed along the boundary of the third surface 311-3 facing the second direction D2, among the side surfaces. For example, the first conductive portion 611 may be disposed along a part (e.g., a first part) of the boundary of the third surface 311-3. The second conductive portion 612 may be disposed along another part (e.g., a second part) of the boundary of the third surface 311-3. The first conductive portion 611 and the second conductive portion 612 may be electrically separated. For example, a non-conductive portion (e.g., a first non-conductive portion 621 and/or a second non-conductive portion 622) may be disposed between the first conductive portion 611 and the second conductive portion 612.

The first conductive portion 611 and the second conductive portion 612 may be implemented in various forms. For example, the second conductive portion 612 may be disposed along a part of the first boundary b1. For example, the second conductive portion 612 being disposed along a second part of the boundary of the third surface 311-3 comprises that the second conductive portion 612 is disposed along a part of the first boundary b1. For example, the second conductive portion 612 may extend from one end 612*a* disposed close to the third boundary b3 to another end 612*b* disposed close to the fourth boundary b4. Both ends 612*a* and 612*b* of the second conductive portion 612 may be in contact with the non-conductive portion 621 and 622. For example, the non-conductive portion 621 and 622 may include a first non-conductive portion 621 in contact with one end 612*a* of the second conductive portion 612 and a second non-conductive portion 622 in contact with the other end 612*b* of the second conductive portion 612.

The first conductive portion 611 may be disposed along another part of the first boundary b1, the third boundary b3, the second boundary b2, and the fourth boundary b4. For example, the first conductive portion 611 may extend from the first non-conductive portion 621 in contact with the one end 612*a* to the second non-conductive portion 622 in contact with the other end 612*b*, through the third boundary b3, the second boundary b2, and the fourth boundary b4. The second conductive portion 612 may be electrically separated from the first conductive portion 611 through the first non-conductive portion 621 and the second non-conductive portion 622. For example, the third surface 311-3 may form a segmented structure by the first conductive portion 611, the second conductive portion 612, the first non-conductive portion 621, and/or the second non-conductive portion 622. However, it is not limited thereto.

The side member 311*c* may include an opening 311*d*. For example, the opening 311*d* may be formed along the inside of the boundaries b1, b2, b3, and b4 of the third surface 311-3. For example, the opening 311*d* may extend from the third surface 311-3 toward the inside of the first housing 210 (e.g., the first direction D1). The opening 311*d* may be filled with a non-conductive material (e.g., a polymer). The first non-conductive portion 621 and/or the second non-conductive portion 622 may be connected to the opening 311*d*. For example, the opening 311*d* may extend to the first non-conductive portion 621 and/or the second non-conductive portion 622. The first boundary b1 and the second boundary b2 may face each other with the opening 311*d* interposed therebetween.

At least one processor may be configured to receive or transmit a communication signal by feeding to the first conductive portion 611 and/or the second conductive portion 612. For example, the first conductive portion 611 and/or the second conductive portion 612 may operate as an antenna for receiving a communication signal from the outside or transmitting a communication signal to the outside. The first conductive portion 611 and/or the second conductive portion 612 may operate as an antenna that resonates at a specified resonant frequency by an electromagnetic field formed when a radiation current flows through the first conductive portion 611 and/or the second conductive portion 612. For example, the first antenna may be referred to as an antenna including the first conductive portion 611. For example, the second antenna distinguished from the first antenna may be referred to as an antenna including the second conductive portion 612. For example, the resonant frequency of the first antenna may be determined based on a length of the first conductive portion 611. For example, the s response frequency of the second antenna may be determined based on a length of the second conductive portion 612.

The first conductive portion 611 and/or the second conductive portion 612 may be in contact with the non-conductive portion 620*a* in the fourth surface 311-4 and/or the non-conductive portion 620*b* in the fifth surface 311-5. The first conductive portion 611 and/or the second conductive portion 612 may be electrically separated from another part of the side member 311*c* by the non-conductive portions 620*a* and 620*b*. For example, the first conductive portion 611 and/or the second conductive portion 612 forming a part of the fourth surface 311-4 may be electrically separated from another part of the fourth surface 311-4 by the non-conductive portion 620*a* in the fourth surface 311-4. For example, the first conductive portion 611 and/or the second conductive portion 612 forming a part of the fifth surface 311-5 may be electrically separated from another part of the fifth surface 311-5 by the non-conductive portion 620*b* in the fifth surface 311-5.

The length of the first conductive portion 611 and the length of the second conductive portion 612 may be different from each other. For example, the length of the first conductive portion 611 may be longer than the length of the second conductive portion 612. When the length of the first conductive portion 611 is longer than the length of the second conductive portion 612, the resonant frequency of the first antenna may be lower than the resonant frequency of the second antenna. For example, since the first antenna and the second antenna may have different response frequencies, a frequency band covered by the first antenna and a frequency band covered by the second antenna may not fully overlap each other, but may partially overlap. The at least one processor may be configured to feed to the first conductive portion 611 and/or the second conductive portion 612, at least partially based on a reception state of the communication signal and/or a transmission state of the communication signal. For example, according to the need, the at least one processor may be configured to communicate with an external electronic device by using a first antenna and a second antenna, or communicate with the external electronic device by selectively using any one of the first antenna and the second antenna.

The electronic device 101 may include a switch circuit 630 and/or a second printed circuit board 327. The at least one processor may be configured to feed to the first conductive portion 611 and/or the second conductive portion 612 through the switch circuit 630 and/or the second printed circuit board 327. For example, the switch circuit 630 may be disposed on the first printed circuit board 324.

The second printed circuit board 327 may electrically connect the at least one processor with the first conductive portion 611 and/or the second conductive portion 612. For example, the second printed circuit board 327 may be a flexible printed circuit board that is at least partially flexible, but is not limited thereto. For example, the second printed circuit board 327 may be electrically connected to the first printed circuit board 324. For example, the second printed circuit board 327 may include a connector 327*a* physically connected to the first printed circuit board 324. The second printed circuit board 327 may be disposed in parallel with the third direction D3 (e.g., the −z direction) so as to be electrically connected to the first conductive portion 611 and the second conductive portion 612.

The at least one processor may be electrically connected to the first conductive portion 611 and/or the second conductive portion 612 through the second printed circuit board 327. For example, the at least one processor may transmit a signal for feeding to the first conductive portion 611 and/or the second conductive portion 612, to the second printed circuit board 327.

Referring to FIG. 7A, the second printed circuit board 327 may include a first contact portion 327-1 in contact with the first conductive portion 611 and a second contact portion 327-2 in contact with the second conductive portion 612. For example, when the at least one processor communicates with an external electronic device through a first antenna including the first conductive portion 611, the at least one processor may be electrically connected to the first conductive portion 611 through a first line L1 connected to the first contact portion 327-1. For example, when the at least one processor communicates with the external electronic device through a second antenna including the second conductive portion 612, the at least one processor may be electrically connected to the second conductive portion 612 through a second line L2 connected to the second contact portion 327-2. However, it is not limited thereto.

Referring to FIG. 7B, the switch circuit 630 may be referred to as a switch circuit (e.g., a switch IC) disposed on the second printed circuit board 327, but is not limited thereto. For example, the switch circuit 630 may be a switch circuit that is disposed on the second printed circuit board 327 and may electrically connect at least one processor with the first conductive portion 611 and/or the second conductive portion 612. The first conductive portion 611 and/or the second conductive portion 612 may be transmitted to be electrically connected to the at least one processor through the switch circuit 630. For example, the at least one processor may be electrically connected to the first conductive portion 611 through a line L connected to the switch circuit 630 and the first line L1 connected to the first contact portion327-1. For example, the at least one processor may be electrically connected to the second conductive portion 612 through the line L connected to the switch circuit 630 and the second line L2 connected to the second contact portion327-2. However, it is not limited thereto. For example, as illustrated in FIG. 5, the switch circuit 630 may be configured to transmit the signal to the first conductive portion 611 and/or the second conductive portion 612, independently of the second printed circuit board 327.

The first contact portion327-1 and the second contact portion327-2 are physical components connecting the second printed circuit board 327 with the first conductive portion 611 and the second conductive portion 612. For example, referring to FIG. 7C, the first contact portion 327-1 and the second contact portion 327-2 may be conductive sheets disposed between the second printed circuit board 327 and the side member 311*c*. For example, a conductive sheet may be a sheet including a material having high electrical conductivity (e.g., metal). For example, the second contact portion327-2 may be a conductive sheet disposed between the second printed circuit board 327 and the second conductive portion 612, and in contact with the second printed circuit board 327 and the second conductive portion 612. For example, the first contact portion327-1 may be a conductive sheet disposed between the second printed circuit board 327 and the first conductive portion 611, and in contact with the second printed circuit board 327 and the first conductive portion 611.

Referring to FIG. 7D, the first contact portion327-1 and the second contact portion327-2 may be a c-clip disposed between the second printed circuit board 327 and the side member 311*c*. For example, the c-clip may be disposed in a compressed state in a gap between the second printed circuit board 327 and the side member 311*c*.

Referring to FIG. 7E, the first contact portion 327-1 and the second contact portion 327-2 may be a screw penetrating the second printed circuit board 327 and inserted into the side member 311*c*. For example, the first contact portion327-1 may be inserted into the first conductive portion 611 by penetrating the second printed circuit board 327. For example, the second contact portion327-2 may be inserted into the second conductive portion 612 by penetrating the second printed circuit board 327. The first contact portion 327-1 and the second contact portion 327-2 shown in FIGS. 6C, 6D, and 6E are exemplary only, and are not limited thereto. For example, the first contact portion327-1 and the second contact portion327-2 may be the described conductive sheet, c-clip, and screw, as well as a bearing, a conductive foam, and/or a pogo pin. The first contact portion 327-1 and the second contact portion 327-2 may be different from each other. For example, the first contact portion 327-1 may be a conductive sheet, and the second contact portion 327-2 may be a c-clip.

Figure 8A:
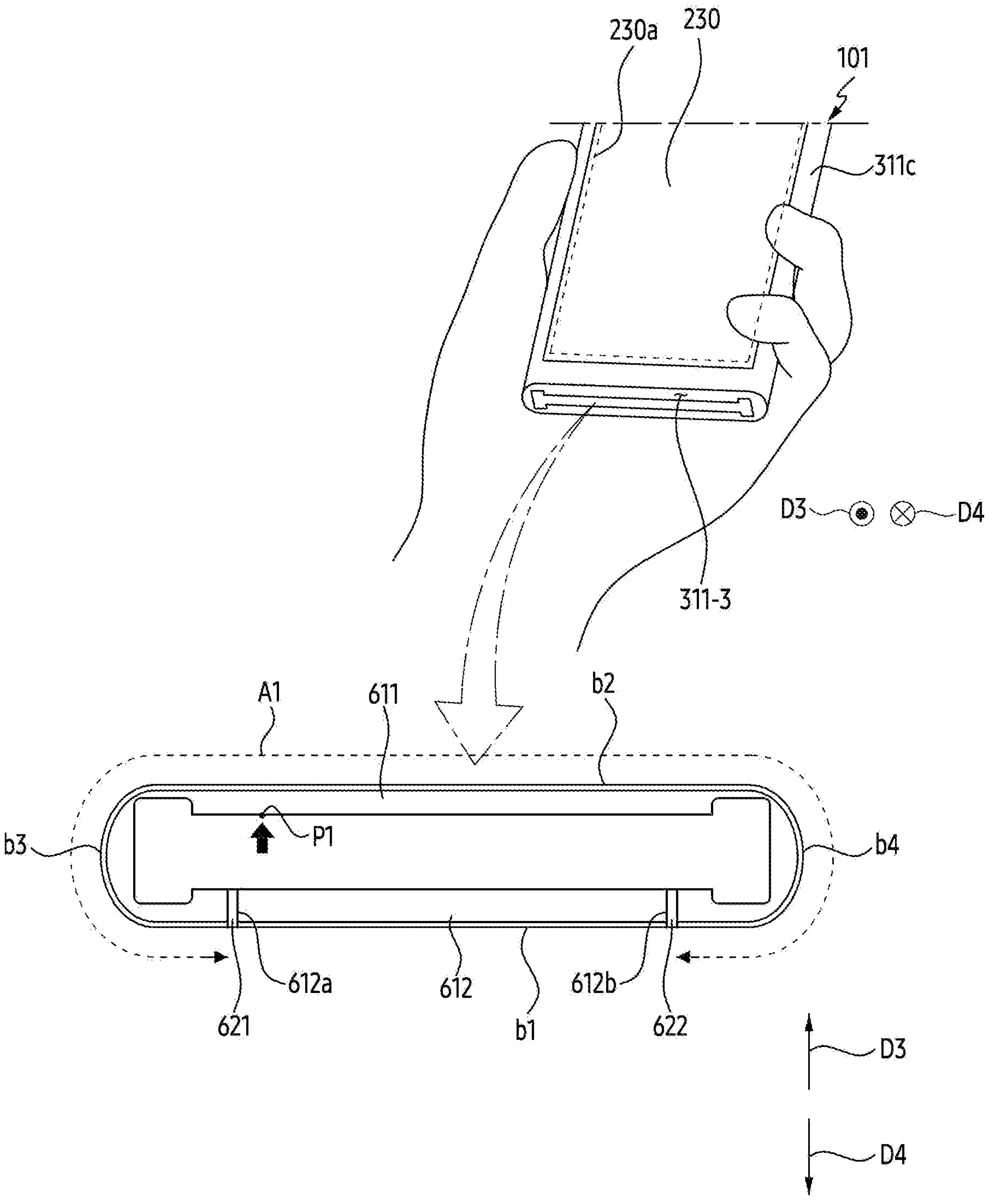
FIG. 8A illustrates a state in which an exemplary electronic device is used in a state in which power is supplied to a first conductive portion.
Figure 8B:
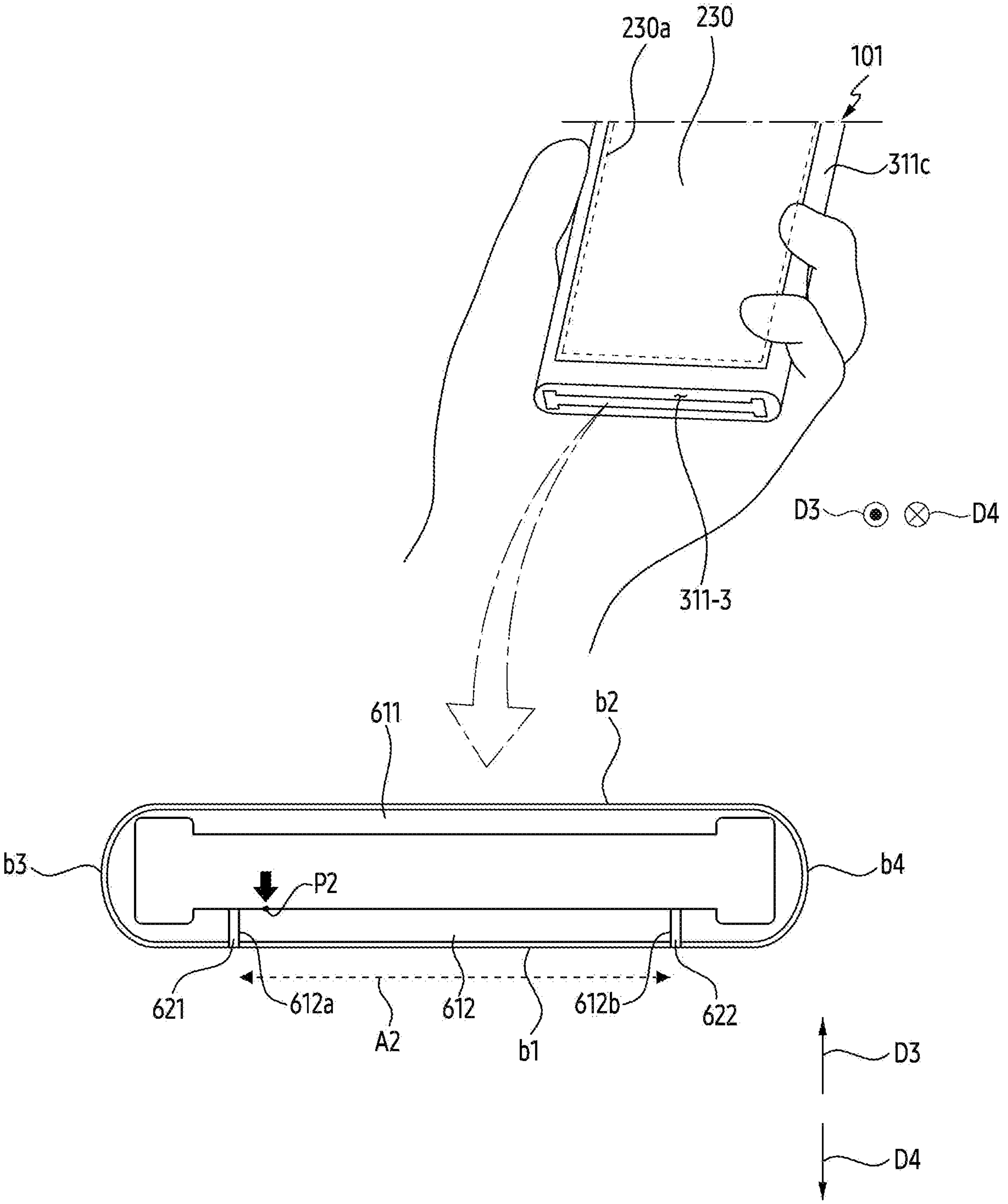
FIG. 8B illustrates a state in which an exemplary electronic device is used in a state in which power is supplied to a second conductive portion.
Figure 8C:
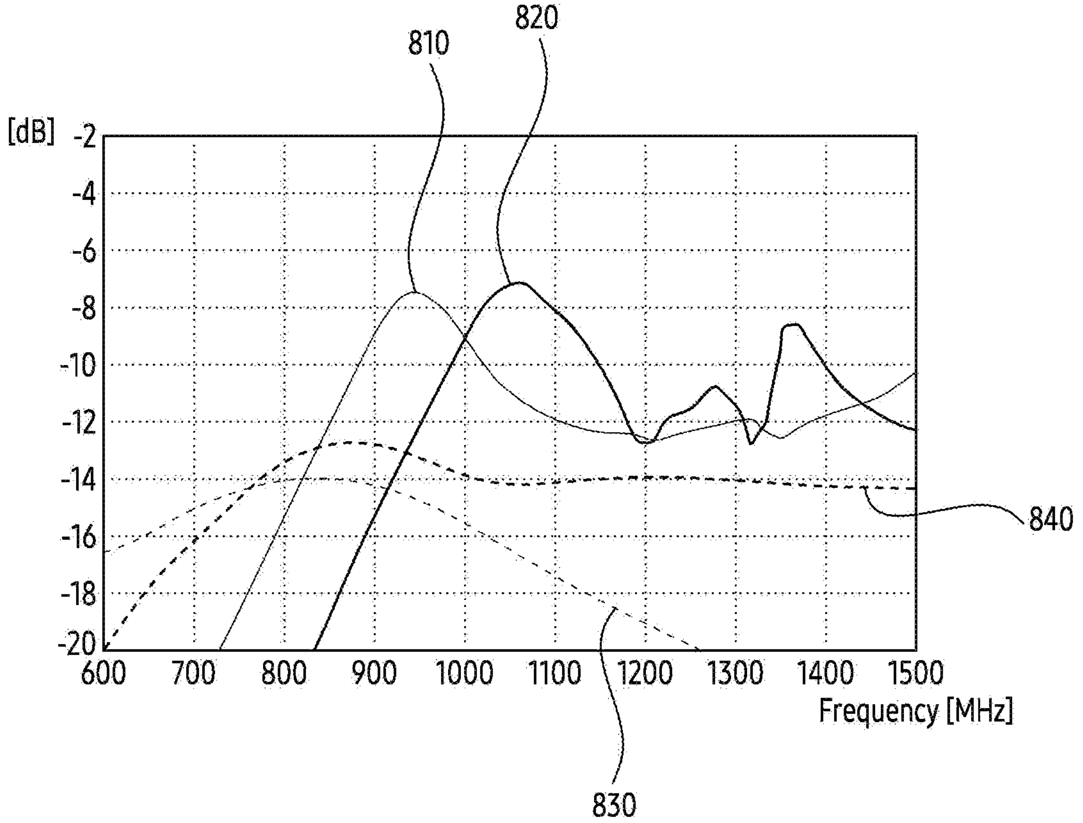
FIG. 8C is a graph illustrating radiation characteristics of an antenna of an exemplary electronic device.

FIG. 8A illustrates a state in which an exemplary electronic device is used in a state in which power is supplied to a first conductive portion. FIG. 8B illustrates a state in which an exemplary electronic device is used in a state in which power is supplied to a second conductive portion. FIG. 8C is a graph illustrating radiation characteristics of an antenna of an exemplary electronic device. The horizontal axis of the graph is frequency (unit: MHz) and the vertical axis of the graph is gain (unit: dB).

Lengths of the first conductive portion 611 and the second conductive portion 612 may be different from each other. For example, a length of the first conductive portion 611 may be longer than a length of the second conductive portion 612. For example, when the length of the first conductive portion 611 is longer than the length of the second conductive portion 612, a resonant frequency of the first antenna may be lower than the resonant frequency of the second antenna. Since the first antenna and the second antenna may have different resonant frequencies, a frequency band covered by the first antenna and the frequency band covered by the second antenna may not fully overlap each other, but may partially overlap. When being fed to the first conductive portion 611 by the at least one processor (the processor 120 of FIG. 1 and/or communication processor), the first conductive portion 611 may operate as an antenna. The first conductive portion 611 operating as an antenna may be referred to as a first antenna. When being fed to the second conductive portion 612 by the at least one processor, the second conductive portion 612 may operate as an antenna. The second conductive portion 612 operating as an antenna may be referred to as a second antenna.

Referring to FIG. 8A, the first conductive portion 611 may be fed by at least one processor. When feeding to a first point P1 within the first conductive portion 611, a path A1 of the radiation current may be formed along the first conductive portion 611. Although the path A1 of the radiation current is illustrated outside the boundaries b1, b2, b3, and b4 of the third surface 311-3 for description, but the path A1 may be formed along at least a part of the boundaries b1, b2, b3, and b4 of the third surface 311-3. Hereinafter, the above description is equally applied to the description of the path.

The first conductive portion 611 may operate as the first antenna through an electromagnetic field formed by the radiation current. For example, since the length of the first conductive portion 611 is longer than the length of the second conductive portion (612), an area of the first antenna may be larger than an area of the second antenna. Since the area of the first antenna is relatively large, the first antenna may transmit and/or receive a communication signal in a relatively wide area of the third surface 311-3. The at least one processor may be configured to transmit and/or receive a communication signal through the first antenna.

The at least one processor may selectively feed to any one of the first point (e.g., the first point P1 of FIG. 7A) within the first conductive portion 611 and the second point (e.g., the second point P2 of FIG. 7B) with in the second conductive portion 612. For example, the at least one processor may identify a transmission state and/or a reception state of the communication signal through the first antenna, and control a switch (e.g., the switch circuit 630 in FIG. 5) so that a power signal provided to the first antenna is provided to the second antenna, based on the identified state.

For example, the first conductive portion 611 disposed along a part of the boundary of the third surface 311-3 of the first housing 210 may be wrapped by a user's hand. When the first conductive portion 611 is wrapped by the user's hand, the first conductive portion 611 may be covered by the user or may be in contact with the user's hand. For example, when the first conductive portion 611 is covered by the user's hand, at least a part of the communication signal emitted from the first antenna and/or the communication signal transmitted from the outside to the first antenna may be shielded by the user's hand. When the first conductive portion 611 is in contact with the user's hand, an impedance value of the first conductive portion 611 may change due to a high permittivity of the body. Referring to FIG. 8A, the electronic device 101 may be used in a state of being gripped by the user's hand. For example, the user may hold the side member 311*c* and use the electronic device 101. For example, when the user uses the electronic device 101 while gripping the first housing 210, the user's hand may be in contact with the relatively long first conductive portion 611. The electromagnetic field formed by the current flowing through the first conductive portion 611 may be in contact with or adjacent to the user's hand. Due to the high permittivity of the user's hand, the impedance value of the first conductive portion 611 may be reduced. As the impedance value of the first conductive portion 611 is reduced, the resonant frequency of the first antenna may be changed from a specified frequency range.

Referring to FIG. 8B, at least one processor may feed power to a second point P2 in the second conductive portion 612. When feeding to the second conductive portion 612, a path A2 of the radiation current may be formed along the second conductive portion 612. The second conductive portion 612 may operate as the second antenna, through the electromagnetic field formed by the radiation current. The second conductive portion 612 may be disposed along a part of the first boundary b1 among the third surface 311-3 of the first housing 210. In the second antenna, a part that transmits and/or receives a communication signal may be concentrated on the second conductive portion 612. The second conductive portion 612 may be spaced apart from the user's hand rather than the first conductive portion 611, which is close to the user's hand. For example, since the first conductive portion 611 is further spaced apart from the display 230 than the second conductive portion 612, the first conductive portion 611 may be close to the user's hand when the user uses the electronic device 101. Since the second conductive portion 612 may be spaced apart from the user's hand than the first conductive portion 611, the influence of the user's hand may be relatively small. When the user grips the electronic device 101, the second antenna including the second conductive portion 612 may be relatively less affected by the user's hand than the first antenna including the first conductive portion 611. The second conductive portion 612 may be disposed along a part of the first boundary b1 located in the fourth direction D4 opposite to the third direction D3 in which the first area 230*a* of the display 230 faces, among the third surface 311-3. The display 230 may include various electronic components. For example, the display 230 may include a display panel and a display driver integrated circuit (DDI) for driving the display panel. The second conductive portion 612 may be less affected by the display 230 than the first conductive portion 611 disposed along the second boundary b2 located in the third direction D3. In a state in which the user grips the electronic device 101, since an electromagnetic field for transmission and/or reception of communication is concentrated in at least a part of the second conductive portion 612, the second antenna may be less affected by the user's hand than the first antenna. The at least one processor may reduce the influence of the user's hand by transmitting and/or receiving the communication signal through the second antenna in the state in which the user grips the electronic device 101. For example, the at least one processor may identify a transmission state and/or a reception state of the communication signal through the first antenna, and control the switch (e.g., the switch circuit 630 in FIG. 5) so that the power signal provided to the first antenna is provided to the second antenna, based on the identified state.

Referring to FIG. 8C, a first graph 810 indicates the gain according to the frequency of the first antenna in a state in which the electronic device 101 is not affected by the user's hand. A second graph 820 indicates the gain according to the frequency of the second antenna in the state in which the electronic device 101 is not affected by the user's hand. A third graph 830 indicates the gain according to the frequency of the first antenna in a state in which the electronic device 101 is gripped in the user's hand. A fourth graph 840 indicates the gain according to the frequency of the second antenna in the state in which the electronic device 101 is gripped in the user's hand.

Referring to FIG. 8C, the resonant frequency of the first antenna may be formed within a frequency range greater than about 900 MHz and less than about 1000 MHz. The resonant frequency of the second antenna may be formed within a frequency range greater than about 1000 MHz and less than about 1100 MHz. Since the length of the first conductive portion 611 may be longer than the length of the second conductive portion 612, the resonant frequency of the first antenna may be lower than the resonant frequency of the second antenna. In the state in which the electronic device 101 is not affected by the user's hand, the at least one processor may use the first antenna to transmit and/or receive a communication signal having a frequency within a low band (e.g., a frequency band of about 1 GHz or less). For example, in a state in which the electronic device 101 is possessed in a user's bag or pocket, or placed on a desk, the at least one processor may be configured to transmit and/or receive the communication signal having the frequency within the low band through the first antenna.

Referring to the third graph 830, in the state in which the electronic device 101 is gripped by the user, the resonant frequency of the first antenna may be about 800 MHz. Comparing the first graph 810 and the third graph 830, the gain of the first antenna may be reduced by about 6 dB or more in a state in which the electronic device 101 is gripped by the user. For example, in the state in which the electronic device 101 is gripped by the user, when at least one processor transmits and/or receives a communication signal having a frequency greater than about 1000 MHz and less than about 1100 MHz through the first antenna, the performance of the first antenna may be degraded.

Comparing the third graph 830 and the fourth graph 840, the gain of the second antenna may be about 1.5 dB or more higher than the gain of the first antenna in the state in which the electronic device 101 is gripped by the user. Since the gain of the second antenna is higher than the gain of the first antenna in the state in which the electronic device 101 is gripped by the user within a frequency range greater than about 1000 MHz and less than about 1100 MHz, the performance of the second antenna may be high. The at least one processor may be configured to communicate through the first antenna when the electronic device 101 is not affected by the user's hand, and communicate through the second antenna when the electronic device 101 is gripped by the user. The electronic device 101 may reduce deterioration of radiation performance caused by the user's hand.

Figure 9A:
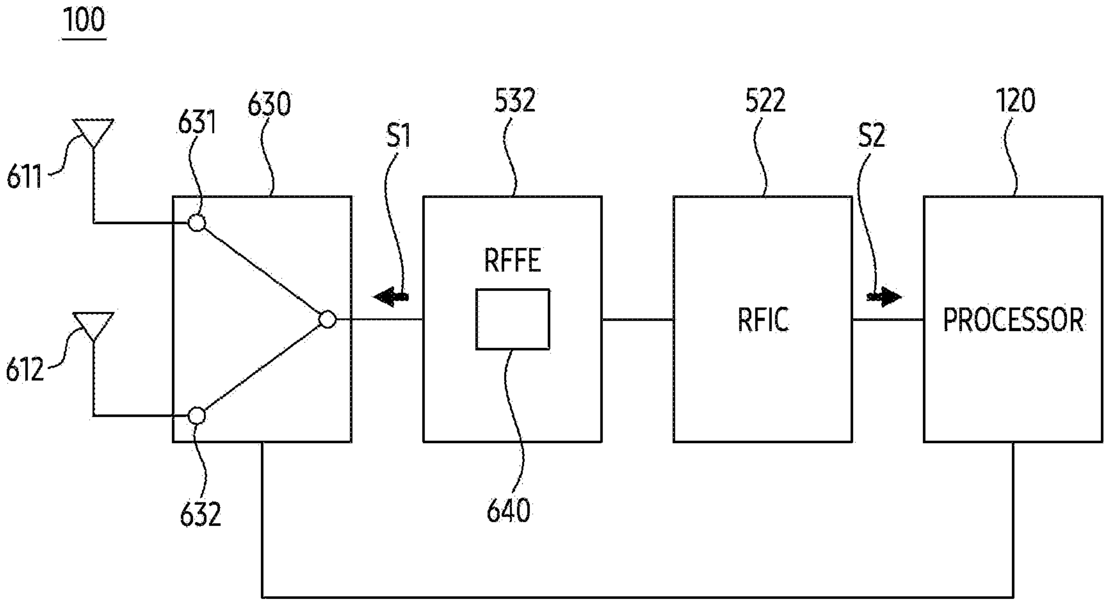
FIG. 9A is a simplified block diagram of an exemplary electronic device.
Figure 9B:
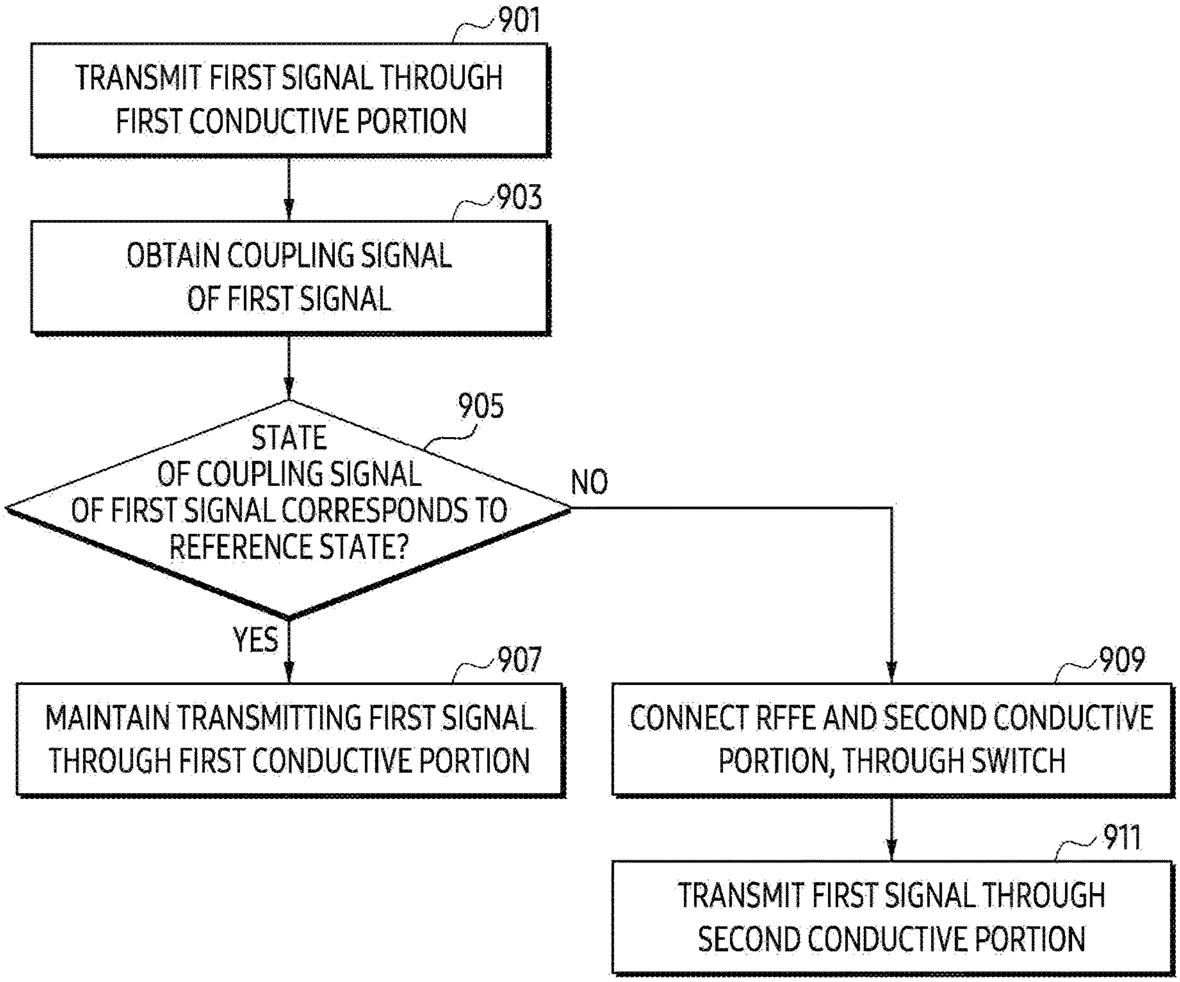
FIG. 9B is a flowchart illustrating an example of an operation in which an electronic device transmits a communication signal.
Figure 9C:
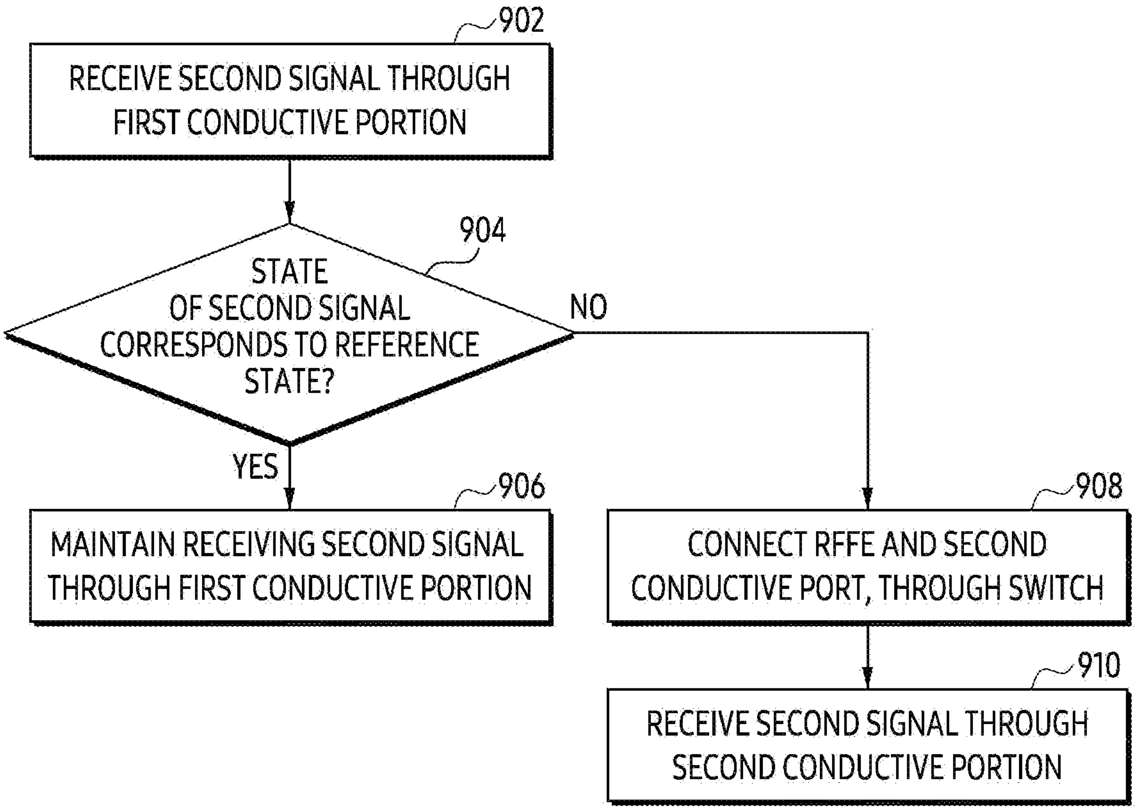
FIG. 9C is a flowchart illustrating an example of an operation in which an electronic device receives a communication signal.

FIG. 9A is a simplified block diagram of an exemplary electronic device. FIG. 9B is a flowchart illustrating an example of an operation in which an electronic device transmits a communication signal. FIG. 9C is a flowchart illustrating an example of an operation in which an electronic device receives a communication signal.

Referring to FIG. 9A, the electronic device 101 may include a radio frequency integrated circuit 522 (RFIC) and a radio frequency front end (RFFE) for communication with an external electronic device. For example, the electronic device 101 may transmit a communication signal to an external electronic device by using the RFIC 522 and the RFFE 532, or may receive a communication signal from the external electronic device by using the RFIC 522 and the RFFE 532.

The electronic device 101 may include a switch circuit 630 for electrically connecting the first conductive portion 611 and/or the second conductive portion 612 to the RFFE 532. The switch circuit 630 may be referred to as the switch circuit 630 of FIG. 5. The switch circuit 630 may be controlled by the at least one processor 120. The at least one processor 120 may be the processor 120 of FIG. 1 and/or the communication processor. However, it is not limited thereto.

The at least one processor 120 may control the switch circuit 630 so that the first conductive portion 611 and/or the second conductive portion 612 are electrically connected with the and the RFFE 532. For example, when the first conductive portion 611 and the RFFE 532 are electrically connected, the at least one processor 120 may be configured to communicate with the external electronic device through the first conductive portion 611. For example, the switch circuit 630 may include a first terminal 631 connected to the first conductive portion 611 and a second terminal 632 connected to the second conductive portion 612.

The at least one processor 120 may electrically connect the first conductive portion 611 and the RFFE 532 through the switch circuit 630. In a state in which the first conductive portion 611 and the RFFE 532 are electrically connected, the at least one processor 120 may be configured to feed to the first conductive portion 611. The at least one processor 120 may electrically connect the second conductive portion 612 and the RFFE 532 through the switch circuit 630. In a state in which the second conductive portion 612 and the RFFE 532 are electrically connected, the at least one processor 120 may be configured to feed to the second conductive portion 612.

The RFFE 532 may include a coupler 640. For example, the coupler 640 may be used to obtain a coupling signal that is a part of a signal transmitted through the first conductive portion 611 and/or the second conductive portion 612. The coupler 640 may be electrically connected to the first conductive portion 611 and/or the second conductive portion 612 through the switch circuit 630.

When transmitting a communication signal, the RFIC 522 may transmit an electrical signal (e.g., a digital signal) having a frequency within the base band to the RFIC 522. The RFIC 522 may up-convert a baseband signal generated by the at least one processor 120 into a signal of a specified frequency band. The signal amplified in the RFFE 532 may be referred to as a first signal S1. The first signal S1 may be transmitted to the outside through the first conductive portion 611 and/or the second conductive portion 612 connected to the switch circuit 630. When receiving a communication signal, the communication signal may be obtained through the first conductive portion 611 and/or the second conductive portion 612, and may be pre-processed through the RFFE 532. The RFIC 522 may down-convert the pre-processed communication signal into a baseband signal for processing by the at least one processor 120. The downconverted signal may be referred to as a second signal S2. The at least one processor 120 may receive the second signal S2.

The at least one processor 120 may control the switch circuit 630 to be connected to the first conductive portion 611 or the second conductive portion 612, based on a coupling signal of the first signal S1 obtained through the coupler 640 and/or the second signal S2. Hereinafter, referring to FIG. 9B, an operation of the at least one processor 120 when transmitting the communication signal to the external electronic device will be described.

Referring to FIG. 9B, in operation 901, the at least one processor (e.g., the at least one processor 120 in FIG. 9A) may transmit a first signal (e.g., the first signal S1 in FIG. 9A) to an external electronic device through a first conductive portion (e.g., the first conductive portion 611 in FIG. 9A). As described above, the first conductive portion 611 referred to as the first antenna may be more suitable for transmitting and/or receiving a communication signal having a frequency within the low band than the second conductive portion (e.g., the second conductive portion 612 of FIG. 9A) referred to as the second antenna. The at least one processor 120 may be configured to transmit the first signal S1 obtained by using the RFIC (e.g., the RFIC 522 in FIG. 9A) and the RFFE (e.g., the RFFE 532 in FIG. 9A), through the first conductive portion 611 connected to the RFFE 532. For example, the first signal S1 may be transmitted to the first conductive portion 611 connected to the first terminal (e.g., the first terminal 631 in FIG. 9A) and may be transmitted to the external electronic device through the first conductive portion 611.

In operation 903, the at least one processor 120 may obtain a coupling signal of the first signal S1 through a coupler (e.g., the coupler 640 of FIG. 9A). For example, the coupling signal of the first signal S1 may be a part of the first signal S1 transmitted through the first conductive portion 611. Since the coupling signal of the first signal S1 is a part of the first signal S1, the coupling signal of the first signal S1 may indicate a transmission state of the first signal S1. For example, the coupling signal of the first signal S1 may be used to obtain information on a state of the first conductive portion 611. For example, the coupling signal of the first signal S1 may indicate whether the first signal S1 has a frequency within a targeted frequency range.

In operation 905, the at least one processor 120 may identify whether a state of the coupling signal of the first signal S1 corresponds to a reference state based on the coupling signal of the first signal S1. For example, based on comparing the reference information with information indicating the quality of the coupling signal of the first signal S1, the at least one processor 120 may identify whether a state of the coupling signal of the first signal S1 corresponds to the reference state. For example, the information may be obtained based on identifying adjacent channel power ratio (ACPR), adjacent channel leakage ratio (ACLR), or error vector magnitude (EVM) of the coupling signal of the first signal S1. For example, the reference information may be a parameter used to identify the state of the coupling signal of the first signal S1. For example, the state of the coupling signal of the first signal S1 corresponding to the reference state may indicate a state in which the first signal S1 transmitted to the external electronic device is transmitted through the first conductive portion 611 within the targeted frequency range. However, it is not limited thereto. For example, the state of the coupling signal of the first signal S1 corresponding to the reference state may indicate a state in which the first signal S1 transmitted to the external electronic device is transmitted through the first conductive portion 611 with a targeted transmission power.

The at least one processor 120 may execute operation 907 based on identifying the state of the coupling signal of the first signal S1 corresponding to the reference state, and execute operation 909 based on identifying a state of the coupling signal of the first signal S1 different from the reference state.

In operation 907, the at least one processor 120 may maintain transmitting the first signal S1 through the first conductive portion 611 based on the state of the coupling signal of the first signal S1 corresponding to the reference state. For example, the at least one processor 120 may identify that a transmission state of the communication signal using the first conductive portion 611 is in a normal operation state, based on the state of the coupling signal of the first signal S1 corresponding to the reference state. In the normal operation state, the at least one processor 120 may control the switch circuit 630 to transmit a signal following the first signal S1 through the first conductive portion 611. For example, the at least one processor 120 may control the switch circuit 630 to maintain electrically connecting the switch circuit 630 to the first terminal 631. The at least one processor 120 may transmit a communication signal to the external electronic device through the first conductive portion 611 connected to the switch circuit 630.

In operation 909, based on the state of the coupling signal of the first signal S1 different from the reference state, the at least one processor 120 may disconnect the electrical connection between the RFFE 532 and the first conductive portion 611 through the switch circuit 630, and electrically connect the RFFE 532 and the second conductive portion 612. For example, based on a state of the coupling signal of the first signal S1 that does not correspond to the reference state, the at least one processor 120 may identify that a transmission state of the communication signal using the first conductive portion 611 is different from the normal operation state. For example, the state of the coupling signal of the first signal S1 different from the reference state may indicate that the quality of the first signal S1 (e.g., the intensity and/or sensitivity of the first signal S1) transmitted through the first antenna including the first conductive portion 611 is different from the reference state. Referring back to the third graph 830 of FIG. 8C, in a state in which the electronic device 101 is gripped by the user, the gain of the first antenna may be reduced. For example, within the state in which the electronic device 101 is gripped by the user, a transmission state of the first signal S1 may be identified as a state different from the normal operation state. In the state different from the normal operation state, the at least one processor 120 may control the switch circuit 630 to transmit the signal following the first signal S1 through the second conductive portion 612 among the first conductive portion 611 and the second conductive portion 612. For example, the at least one processor 120 may control the switch circuit 630 so that the switch circuit 630 is electrically disconnected from the first conductive portion 611 and the second conductive portion 612 connected to the second terminal (e.g., the second terminal 632 of FIG. 9A) and the RFFE 532 are electrically connected. Since the first conductive portion 611 is electrically disconnected from the first terminal 631, and electrically connected to the second terminal 632, the first conductive portion 611 may be electrically disconnected from the RFFE 532, and the second conductive portion 612 may be electrically connected to the RFFE 532.

In operation 911, the at least one processor 120 may transmit the first signal S1 through the second conductive portion 612. The at least one processor 120 may be configured to transmit the first signal S1 obtained by using the RFIC 522 and the RFFE 532 through the second conductive portion 612 electrically connected to the RFFE 532. For example, the first signal S1 may be transmitted to the second conductive portion 612 connected to the second terminal 632 and may be transmitted to an external electronic device through the second conductive portion 612.

Hereinafter, referring to FIG. 9C, an operation of the at least one processor 120 when receiving the communication signal from the external electronic device will be described. Among the descriptions described with reference to FIG. 9B, overlapping descriptions will be briefly described or omitted.

Referring to FIG. 9C, in operation 902, the at least one processor (e.g., the at least one processor 120 in FIG. 9A) may receive a second signal (e.g., the second signal S2 in FIG. 9A) from an external electronic device through a first conductive portion (e.g., the first conductive portion 611 in FIG. 9A). For example, the second signal S2 may be a communication signal having a frequency in a low band, but is not limited thereto. The at least one processor 120 may obtain a second signal S2 received through the first conductive portion 611 by using an RFIC (e.g., the RFIC 522 in FIG. 9A) and an RFFE (e.g., the RFFE 532 in FIG. 9A). For example, a switch (e.g., the switch circuit 630 in FIG. 9A) may be connected to a first terminal (e.g., the first terminal 631 in FIG. 9A). The at least one processor 120 may receive the second signal S2 through the first conductive portion 611, the switch circuit 630, the RFFE 532, and the RFIC 522.

In operation 904, the at least one processor 120 may identify whether a state of the second signal S2 corresponds to a reference state. For example, the at least one processor 120 may obtain information indicating the quality of the second signal S2. For example, the information may be obtained based on identifying an adjacent channel power ratio (ACPR), adjacent channel leakage ratio (ACLR), or error vector magnitude (EVM) of the second signal S2. The at least one processor 120 may identify whether the state of the second signal S2 corresponds to the reference state based on comparing the information with the reference information. For example, the state of the second signal S2 corresponding to the reference state may indicate a state in which information indicating the quality of the second signal S2 received from the external electronic device corresponds to the reference information.

The at least one processor 120 may execute operation 906 based on identifying the state of the second signal S2 corresponding to the reference state, and may execute operation 908 based on identifying the state of the second signal S2 different from the reference state.

In operation 906, the at least one processor 120 may maintain receiving the second signal S2 through the first conductive portion 611, based on the state of the second signal S2 corresponding to the reference state. For example, the at least one processor 120 may identify that a reception state of the communication signal using the first conductive portion 611 is in a normal operation state based on the state of the second signal S2 corresponding to the reference state. In the normal operation state, the at least one processor 120 may control the switch circuit 630 to receive a signal following the second signal S2 through the first conductive portion 611. For example, the at least one processor 120 may control the switch circuit 630 to maintain electrically connecting the switch circuit 630 to the first terminal 631.

In operation 908, the at least one processor 120 may disconnect the electrical connection between the RFFE 532 and the first conductive portion 611, and may electrically connect the RFFE 532 and the second conductive portion (e.g., the second conductive portion 612 of FIG. 9A) through the switch circuit 630 based on the state of the second signal S2 different from the reference state. For example, the at least one processor 120 may identify that a reception state of the communication signal using the first conductive portion 611 is different from the normal operation state based on the state of the second signal S2 that does not correspond to the reference state. For example, the state of the second signal S2 different from the reference state may indicate a state in which information indicating the quality of the second signal S2 received from the external electronic device does not correspond to the reference information. Referring back to the third graph 830 of FIG. 8C, in a state in which the electronic device 101 is gripped by the user, the gain of the first antenna in the specified frequency band may be lower than the gain of the second antenna. In the state in which the electronic device 101 is gripped by the user, a transmission state of the second signal S2 may be identified as a state different from the normal operation state. In the state different from the normal operation state, the at least one processor 120 may control the switch circuit 630 to receive the signal of the second signal S2 through the second conductive portion 612 among the first conductive portion 611 and the second conductive portion 612. For example, the at least one processor 120 may control the switch circuit 630 so that the switch circuit 630 is electrically disconnected from the first terminal 631 and electrically connected to the second terminal (e.g., the second terminal 632 of FIG. 9A). As the switch circuit 630 is electrically disconnected from the first terminal 631 and electrically connected to the second terminal 632, the first conductive portion 611 may be electrically disconnected from the RFFE 532, and the second conductive portion 612 may be electrically connected to the RFFE 532.

In operation 910, the at least one processor 120 may receive the second signal S2 through the second conductive portion 612. The at least one processor 120 may be configured to receive the second signal S2 through the second conductive portion 612 connected to the RFFE 532. For example, the second signal S2 may be transmitted to the at least one processor 120 through the switch circuit 630 connected to the second terminal 632.

As described above, based on the coupling signal of the first signal S1 and/or the second signal S2, the electronic device 101 may select any one of the first conductive portion 611 and the second conductive portion 612 as an antenna for communicating with the external electronic device. For example, when transmitting and/or receiving a communication signal having a frequency within the low band in the state in which the electronic device 101 is not affected by the user's hand, the electronic device 101 may transmit and/or receive a communication signal to the external electronic device through the first conductive portion 611. For example, when transmitting the communication signal having a frequency within the low band in the state in which the electronic device 101 is gripped in the user's hand, the electronic device 101 may transmit and/or receive the communication signal to the external electronic device through the second conductive portion 612. The electronic device 101 may use a suitable antenna depending on a situation by selectively using the first conductive portion 611 or the second conductive portion 612. The first conductive portion 611 and the second conductive portion 612 may be implemented in various forms.

Figure 10:
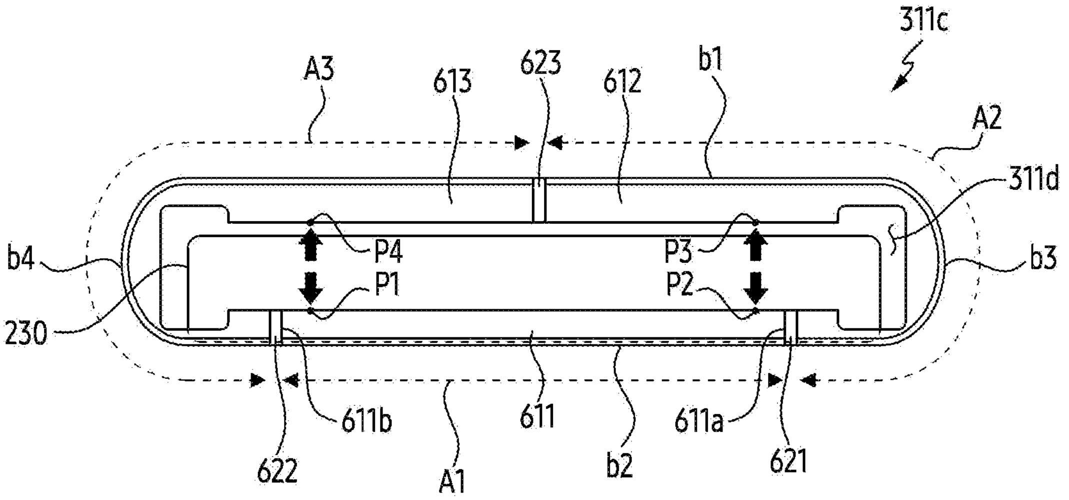
FIGS. 10, 11, 12, and 13 are front views of a third surface of a first housing of an exemplary electronic device.

FIG. 10 is a front view of a third surface of a first housing of an exemplary electronic device.

Referring to FIG. 10, the side member 311*c* may include a first conductive portion 611, a second conductive portion 612, and/or a third conductive portion 613. The first conductive portion 611, the second conductive portion 612, and/or the third conductive portion 613 may be electrically separated from each other. The side member 311*c* may include a plurality of non-conductive portions 621, 622, and 623 for electrically separating the first conductive portion 611, the second conductive portion 612, and the third conductive portion 613. For example, the first non-conductive portion 621 may be disposed between the first conductive portion 611 and the second conductive portion 612. The second non-conductive portion 622 may be disposed between the first conductive portion 611 and the third conductive portion 613. The third non-conductive portion 623 may be disposed between the second conductive portion 612 and the third conductive portion 613. However, it is not limited thereto.

The first conductive portion 611 may be disposed along a part of the second boundary b2. For example, the first conductive portion 611 being disposed along a first part of the boundary of the third surface (311-3) includes that the first conductive portion 611 is disposed along a part of the second boundary (b2). Both ends 611*a* and 611*b* of the first conductive portion 611 may be in contact with the first non-conductive portion 621 and the second non-conductive portion 622. For example, the first non-conductive portion 621 may be in contact with one end 611*a* close to the third boundary b3 of both ends 611*a* and 611*b* of the first conductive portion 611. For example, the second non-conductive portion 622 may be in contact with the other end 611*b* close to the fourth boundary b4 of both ends of the first conductive portion 611.

The second conductive portion 612 may extend from the first non-conductive portion 621 to the third non-conductive portion 623 disposed within the first boundary b1. For example, the second conductive portion 612 may extend from the first non-conductive portion 621 to the third non-conductive portion 623 with in the first boundary b1 through (or along) the second boundary b2 and the third boundary b3. The third conductive portion 613 may extend from the second non-conductive portion 622 to the third non-conductive portion 623 within the first boundary b1 through the second boundary b2 and the fourth boundary b4. The first boundary b1 and the second boundary b2 may be spaced apart from each other with the opening 311*d* interposed therebetween. The third boundary b3 and the fourth boundary b4 may be spaced apart from each other with the opening 311*d* interposed therebetween.

The at least one processor (e.g., the processor 120 of FIG. 1 and/or the communication processor) may be configured to receive or transmit a communication signal by feeding to the first conductive portion 611, the second conductive portion 612, and/or the third conductive portion 613. For example, when the at least one processor feeds power to the first point P1 or the second point P2 within the first conductive portion 611, a first path A1 of the radiation current may be formed along the first conductive portion 611. An electromagnetic field may be formed by the radiation current. The first conductive portion 611 may operate as a first antenna that resonates at a specified resonant frequency by the electromagnetic field. When the at least one processor feeds power to the third point P3 in the second conductive portion 612, a second path A2 of the radiation current may be formed along the second conductive portion 612. The second conductive portion 612 may operate as a second antenna that resonates at a specified resonant frequency. When the at least one processor feeds power to the fourth point P4 in the third conductive portion 613, a third path A3 through which the radiation current flows may be formed along the third conductive portion 613. The third conductive portion 613 may operate as a third antenna that resonates at a specified resonant frequency.

The at least one processor may be configured to selectively feed to the first conductive portion 611, the second conductive portion 612, and/or the third conductive portion 613. An operation of the at least one processor may be referred to as the operations illustrated in FIGS. 9B and 9C. For example, the at least one processor may control a switch (e.g., the switch circuit 630 in FIG. 9A) based on a state of the coupling signal of the first signal S1. When the switch circuit 630 is electrically connected to the first conductive portion 611, the second conductive portion 612, and/or the third conductive portion 613, the at least one processor may be configured to communicate with an external electronic device through the first conductive portion 611, the second conductive portion 612, and/or the third conductive portion 613. The at least one processor may select at least one of the first antenna, the second antenna, and the third antenna by controlling the switch circuit 630 based on the transmission state and/or reception state of the communication signal.

For example, the at least one processor may communicate with the external electronic device through the first conductive portion 611. When the first conductive portion 611 is contacted to the user's hand, a state of the coupling signal of the first signal transmitted through the first conductive portion 611 and/or a state of the second signal received through the first conductive portion 611 may be different from the reference state. The at least one processor may electrically disconnect the first conductive portion 611 and the RFFE (e.g., the RFFE 532 of FIG. 9*a*) and electrically connect the second conductive portion 612 and/or the third conductive portion 613 to the RFFE (e.g., the RFFE 532 of FIG. 9A) by controlling the switch circuit 630 based on the state of the coupling signal of the first signal and/or the state of the second signal. The at least one processor may select an antenna suitable for a state of the electronic device (e.g., the electronic device 101 of FIG. 5).

Figure 11:
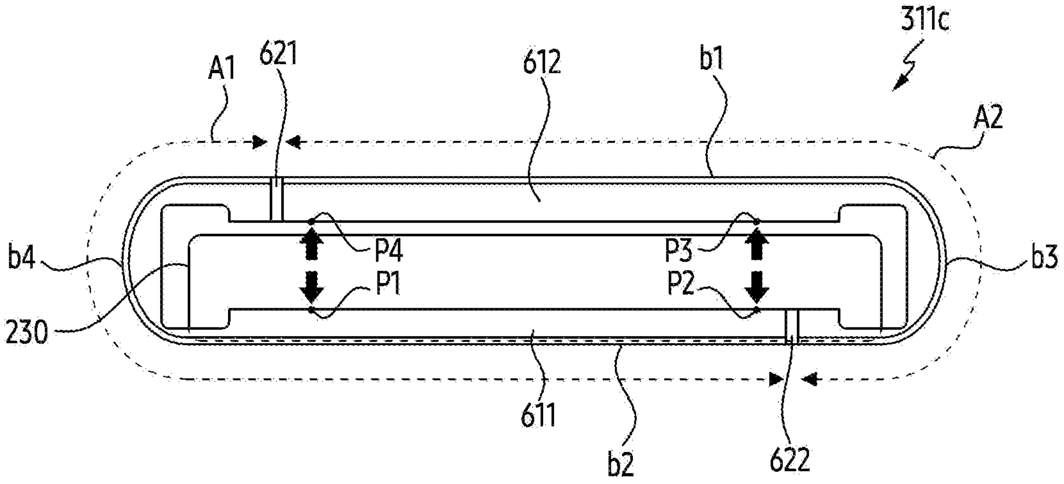

FIG. 11 is a front view of a third surface of a first housing of an exemplary electronic device.

Referring to FIG. 11, the first conductive portion 611 may extend from the first non-conductive portion 621 disposed closer to the fourth boundary b4 than the third boundary b3 within the second boundary b2, to the second non-conductive portion 622 disposed closer to the third boundary b3 than the fourth boundary b4 within the second boundary b2, through the fourth boundary b4. The second conductive portion 612 may extend from the first non-conductive portion 621 to the second non-conductive portion 622 through the first boundary b1 and the third boundary b3.

For example, the first non-conductive portion 621 may be disposed in the first boundary b1. For example, the second non-conductive portion 622 may be disposed in the second boundary b2. The first non-conductive portion 621 and the second non-conductive portion 622 may be disposed between the first conductive portion 611 and the second conductive portion 612. The first conductive portion 611 and the second conductive portion 612 may be electrically separated through the first non-conductive portion 621 and the second non-conductive portion 622. For example, in the first boundary b1, a part occupied by the second conductive portion 612 may be larger than a part occupied by the first conductive portion 611. In the second boundary b2, the part occupied by the first conductive portion 611 may be larger than the part occupied by the second conductive portion 612.

The at least one processor (e.g., the processor 120 of FIG. 1 and/or the communication processor) may be configured to communicate with the external electronic device by feeding to the first conductive portion 611 and/or the second conductive portion 612. For example, when the at least one processor feeds power to the first point P1 or the second point P2 in the first conductive portion 611, a first path A1 of the radiation current may be formed along the first conductive portion 611. An electromagnetic field may be formed by the radiation current. The first conductive portion 611 may operate as a first antenna that resonates at a specified resonant frequency by the electromagnetic field. For example, when the at least one processor feeds power to the third point P3 or the fourth point P4 in the second conductive portion 612, a second path A2 of the radiation current may be formed along the second conductive portion 612. The electromagnetic field may be formed by the radiation current. The second conductive portion 612 may operate as a second antenna that resonates at the specified resonant frequency by the electromagnetic field.

A length of the first conductive portion 611 may be substantially the same as or similar to a length of the second conductive portion 612. The arrangement of the display (e.g., the display 230 of FIG. 5) may vary according to the state of the electronic device (e.g., the first state shown in FIG. 2A and the second state shown in FIG. 2C). For example, in the first state, a first area (e.g., the first area 230*a* of FIG. 5) of the display 230 may be disposed on substantially the same plane as the second boundary b2, and a second area (e.g., the second area 230*b* of FIG. 5) of the display 230 may be disposed within the first housing 210. For example, in the second state, the first area 230*a* and the second area 230*b* of the display 230 may be disposed on substantially the same plane as the second boundary b2. In the second boundary b2, since a part occupied by the first conductive portion 611 is larger than a part occupied by the second conductive portion 612, the first conductive portion 611 may be more affected by the display 230 than the second conductive portion 612. Since the first conductive portion 611 is more affected by the display 230, a radiation characteristic of the first conductive portion 611 and the second conductive portion 612 may be different even when the length of the first conductive portion 611 and the length of the second conductive portion 612 are substantially the same or similar.

The at least one processor may be configured to feed power to the first conductive portion 611 and/or the second conductive portion 612. An operation of the at least one processor may be referred to as the operations illustrated in FIGS. 9B and 9C. For example, the at least one processor may control a switch (e.g., the switch circuit 630 in FIG. 9A) based on the state of the coupling signal of the first signal S1. When the switch circuit 630 is electrically connected to the first conductive portion 611, the at least one processor may be configured to communicate with the external electronic device through the first conductive portion 611.

For example, the at least one processor may communicate with the external electronic device through the first conductive portion 611. When the first conductive portion 611 is in contact with the user's hand, the state of the coupling signal of the first signal transmitted through the first conductive portion 611 and/or the state of the second signal received through the first conductive portion 611 may be different from the reference state. Based on the state of the coupling signal of the first signal and/or the state of the second signal, the at least one processor may electrically disconnect the first conductive portion 611 and the RFFE (e.g., the RFFE 532 in FIG. 9A), and electrically connect the second conductive portion 612 and the RFFE (e.g., the RFFE 532 in FIG. 9A), by controlling the switch circuit 630. The at least one processor may select an antenna suitable for the state of the electronic device (e.g., the electronic device 101 of FIG. 5).

Figure 12:
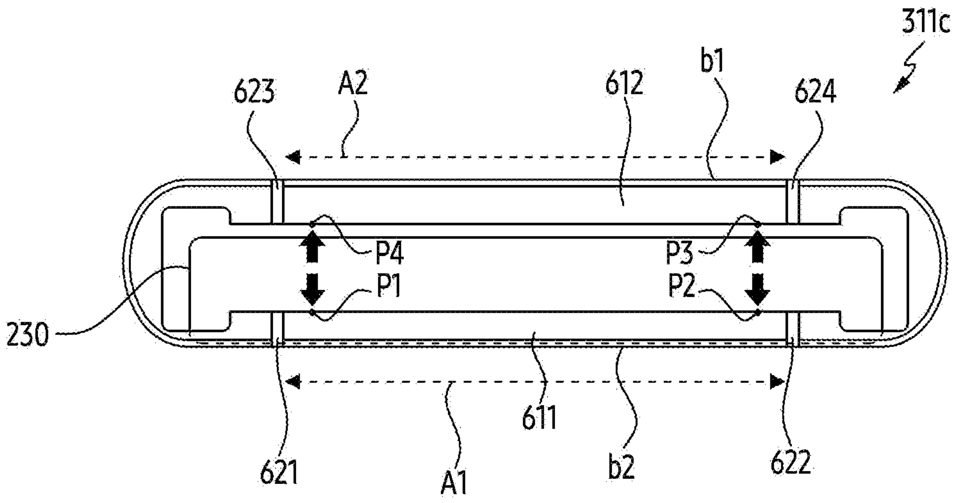

FIG. 12 is a front view of a third surface of a first housing of an exemplary electronic device.

Referring to FIG. 12, the first conductive portion 611 may be disposed along a part of the second boundary b2. The second conductive portion 612 may be disposed along a part of the first boundary b1. For example, the side member 311*c* may include a first non-conductive portion 621 and a second non-conductive portion 622 in contact with both ends of the first conductive portion 611. The side member 311*c* may include a part of the third non-conductive portion 623 and the fourth non-conductive portion 624 in contact with both ends of the second conductive portion 612.

The at least one processor (e.g., the processor 120 of FIG. 1 and/or the communication processor) may be configured to communicate with the external electronic device by feeding power to the first conductive portion 611 and/or the second conductive portion 612. For example, when the at least one processor feeds power to the first point P1 or the second point P2 within the first conductive portion 611, the first path A1 of the radiation current may be formed along the first conductive portion 611. The electromagnetic field may be formed by the radiation current. By the electromagnetic field, the first conductive portion 611 may operate as a first antenna that resonates at the specified resonant frequency. For example, when the at least one processor feeds power to the third point P3 or the fourth point P4 of the second conductive portion 612, the second path A2 of the radiation current may be formed along the second conductive portion 612. The electromagnetic field may be formed by the radiation current. By the electromagnetic field, the second conductive portion 612 may operate as a second antenna that resonates at the specified resonant frequency.

The length of the first conductive portion 611 may be substantially the same as or similar to the length of the second conductive portion 612. The first conductive portion 611 disposed along a part of the second boundary b2 may be more affected by the display (e.g., the display 230 of FIG. 5) than the second conductive portion 612 disposed along a part of the first boundary b1. Since the first conductive portion 611 is more affected by the display 230 even when the length of the first conductive portion 611 and the length of the second conductive portion 612 are substantially the same or similar, the radiation characteristic of the first conductive portion 611 and the second conductive portion 612 may be different.

The at least one processor may be configured to feed power to the first conductive portion 611 and/or the second conductive portion 612. An operation of the at least one processor may be referred to as the operations illustrated in FIGS. 9B and 9C. For example, the at least one processor may control a switch (e.g., the switch circuit 630 in FIG. 9A) based on the state of the coupling signal of the first signal S1. When the switch circuit 630 is electrically connected to the first conductive portion 611, the at least one processor may be configured to communicate with the external electronic device through the first conductive portion 611.

For example, the at least one processor may communicate with the external electronic device through the first conductive portion 611. When the first conductive portion 611 is in contact with the user's hand, a state of the coupling signal of the first signal transmitted through the first conductive portion 611 and/or a state of the second signal received through the first conductive portion 611 may be different from the reference state. The at least one processor may electrically disconnect the first conductive portion 611 and the RFFE (e.g., the RFFE 532 in FIG. 9A), and electrically connect the second conductive portion 612 and the RFFE (e.g., the RFFE 532 in FIG. 9A) by controlling the switch circuit 630 based on the state of the coupling signal of the first signal and/or the state of the second signal. The at least one processor may select an antenna suitable for the state of the electronic device (e.g., the electronic device 101 of FIG. 5).

Figure 13:
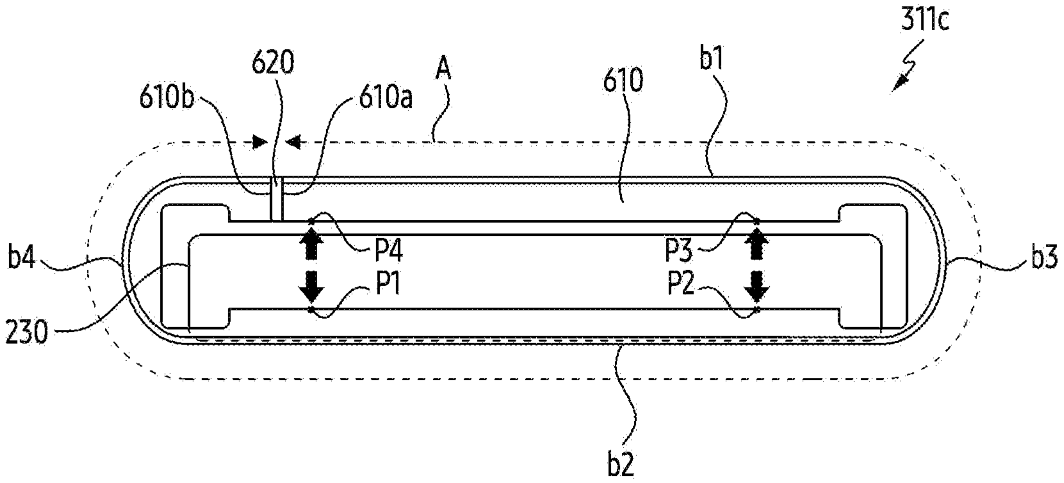

FIG. 13 is a front view of a third surface of a first housing of an exemplary electronic device.

Referring to FIG. 13, the side member 311*c* may include a conductive portion 610 extending along the boundaries b1, b2, b3, and b4 of the third surface 311-3 and a non-conductive portion 620 disposed between one end 610*a* of the conductive portion 610 and another end 610*b* opposite to the one end 610*a*. For example, the non-conductive portion 620 may be disposed in the first boundary b1. The one end 610*a* of the conductive portion 610 may be in contact with one side of the non-conductive portion 620, and the other end 610*b* of the conductive portion 610 may be in contact with another side of the non-conductive portion 620.

The at least one processor (the processor 120 in FIG. 1 and/or communication processor) may feed power to the first point P1 or the second point P2 within the conductive portion 610. For example, the first point P1 may be located within the second boundary b2. For example, the second point P2 may be located within the first boundary b1. When feeding power to the first point P1 or the second point P2, the path A of the radiation current may be formed along the conductive portion 610.

The radiation characteristic of the antenna may be different based on whether the at least one processor feeds power to the first point P1 or feeds power to the second point P2. For example, when the at least one processor feeds power to the first point P1 located within the first boundary b2, the radiation current may flow from the first boundary b2 to the first boundary b1 through the third boundary b3. For example, when at least one processor feeds power to the second point P2 located within the first boundary b1, the radiation current may flow from the first boundary b1 to the second boundary b2 through the third boundary b3. Since the radiation current flowing along the second boundary b2 is more affected by the display (e.g., the display 230 of FIG. 5) than the radiation current flowing along the first boundary b1, the conductive portion 610 may be more affected by the display 230 when feeding power to the first point P1 than when feeding power to the second point P2. The resonant frequency of the antenna by conductive portion 610 and the resonant frequency of the antenna by conductive portion 610 may be different when feeding power to the second point P2.

The at least one processor may be configured to feed power to the first point P1 and/or the second point P2. An operation of the at least one processor may be referred to as the operations illustrated in FIGS. 9B and 9C. For example, the at least one processor may selectively feed power to the first point P1 or the second point P2 based on the state of the coupling signal of the first signal S1. For example, a switch (e.g., the switch circuit 630 in FIG. 9A) may be selectively connected to any one of the first point P1 or the second point P2.

For example, the at least one processor may communicate with an external electronic device by feeding power to the first point P1. The at least one processor may be configured to feed power to the first point P1 or the second point P2 by controlling the switch circuit 630 based on the state of the coupling signal of the first signal and/or the state of the second signal. The at least one processor may select a feeding power position suitable for a state of the electronic device (e.g., the electronic device 101 of FIG. 5).

The above descriptions are not limited to the electronic device 101 illustrated in FIG. 5, but may be applied substantially the same to electronic devices of various structures. Hereinafter, each of the electronic devices 101 illustrated in FIGS. 14, 15, and 16 may include housing having different structures.

Figure 14:
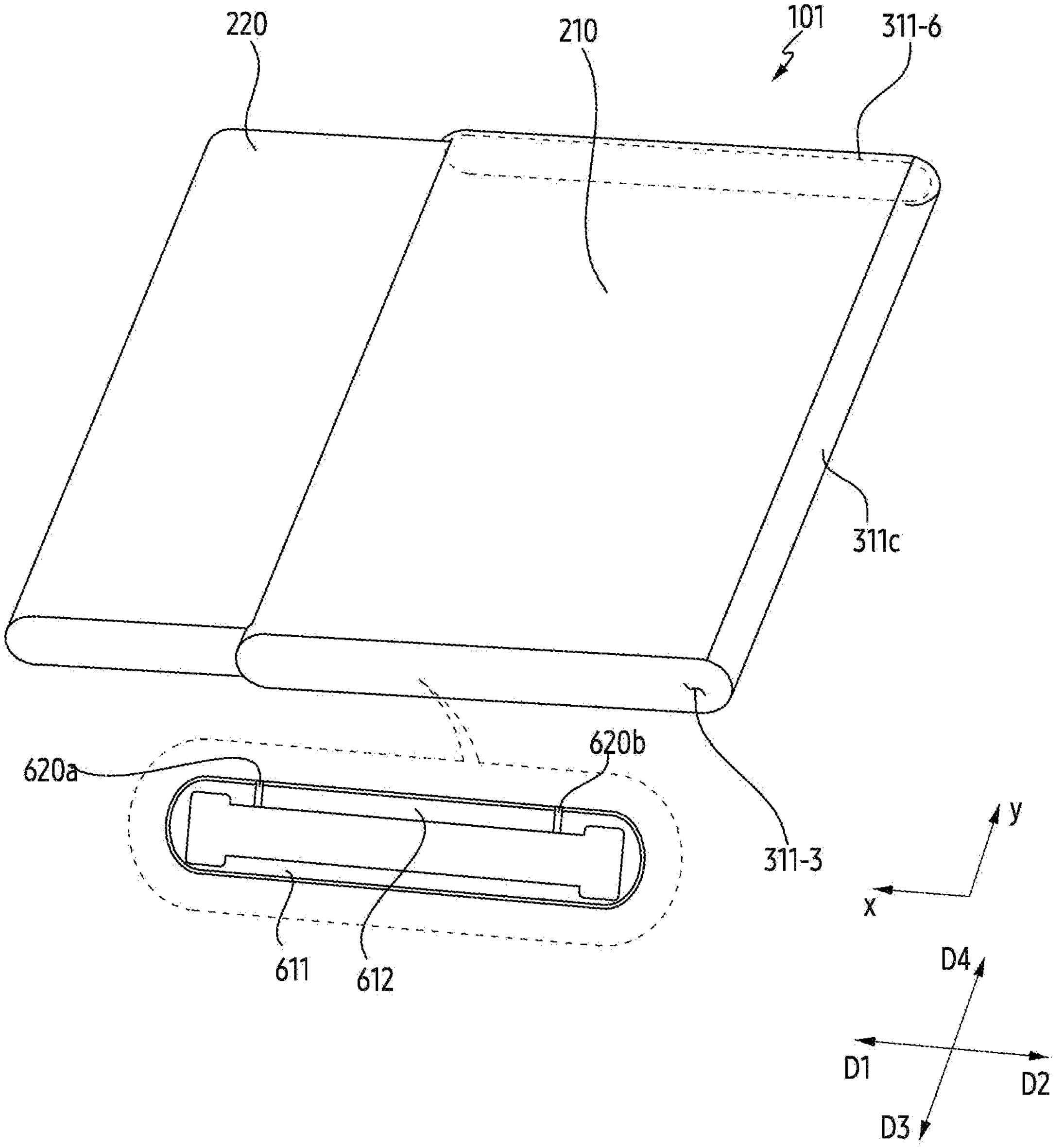
FIGS. 14 and 15 are perspective views of an exemplary electronic device.

FIG. 14 is a perspective view of an exemplary electronic device.

Referring to FIG. 14, a connection direction of the first housing 210 and the second housing 220 of the electronic device 101 shown in FIG. 14 may be different from a connection direction of the first housing 210 and the second housing 220 of the electronic device 101 shown in FIG. 5. For example, the second housing 220 of the electronic device 101 shown in FIG. 5 may be movably coupled to the first housing 210 in a direction parallel to the y-axis. For example, the second housing 220 of the electronic device 101 shown in FIG. 14 may be movably coupled to the first housing 210 in a direction parallel to the x-axis. The second housing 220 may be slid-out from the second housing 220 by moving in the first direction D1 with respect to the first housing 210. The second housing 220 may be slid-in to the second housing 220 by moving in the second direction D2 with respect to the first housing 210.

The first housing 210 may include a side member 311*c* forming side surfaces of the first housing 210. The side member 311*c* may include a first conductive portion 611 and a second conductive portion 612 disposed along the boundaries of the first surface 311-3 facing the third direction D3 perpendicular to the movement direction (e.g., the first direction D1, the second direction D3) of the second housing 220. For example, the side member 311*c* may include the first conductive portion 611 disposed along a part of the boundary of the first surface 311-3 and the second conductive portion 612 disposed along another part of the boundary of the first surface 311-3. The first conductive portion 611 and the second conductive portion 612 may be electrically separated by non-conductive portions 620*a* and 620*b*. The structure may be applied to the second surface 311-6 opposite to the first surface 311-1. For example, the second surface 311-6 facing the fourth direction D4 opposite to the third direction D3 may include conductive portions disposed along a part of the boundary of the second surface 311-6 and non-conductive portions between the conductive portions.

The at least one processor (e.g., the processor 120 of FIG. 1 and/or the communication processor) may be configured to feed power to the first conductive portion 611 and/or the second conductive portion 612. An operation of the at least one processor may be referred to as the operations illustrated in FIGS. 9B and 9C.

For example, the at least one processor may communicate with the external electronic device through the first conductive portion 611. When the first conductive portion 611 contacts to the user's hand, a state of the coupling signal of the first signal transmitted through the first conductive portion 611 and/or a state of the second signal received through the first conductive portion 611 may be different from a reference state. Based on the state of the coupling signal of the first signal and/or the state of the second signal, the at least one processor may electrically disconnect the first conductive portion 611 and the RFFE (e.g., the RFFE 532 in FIG. 9A), and electrically connect the second conductive portion 612 and the RFFE (e.g., the RFFE 532 in FIG. 9A). The at least one processor may select an antenna suitable for the state of the electronic device 101.

Figure 15:
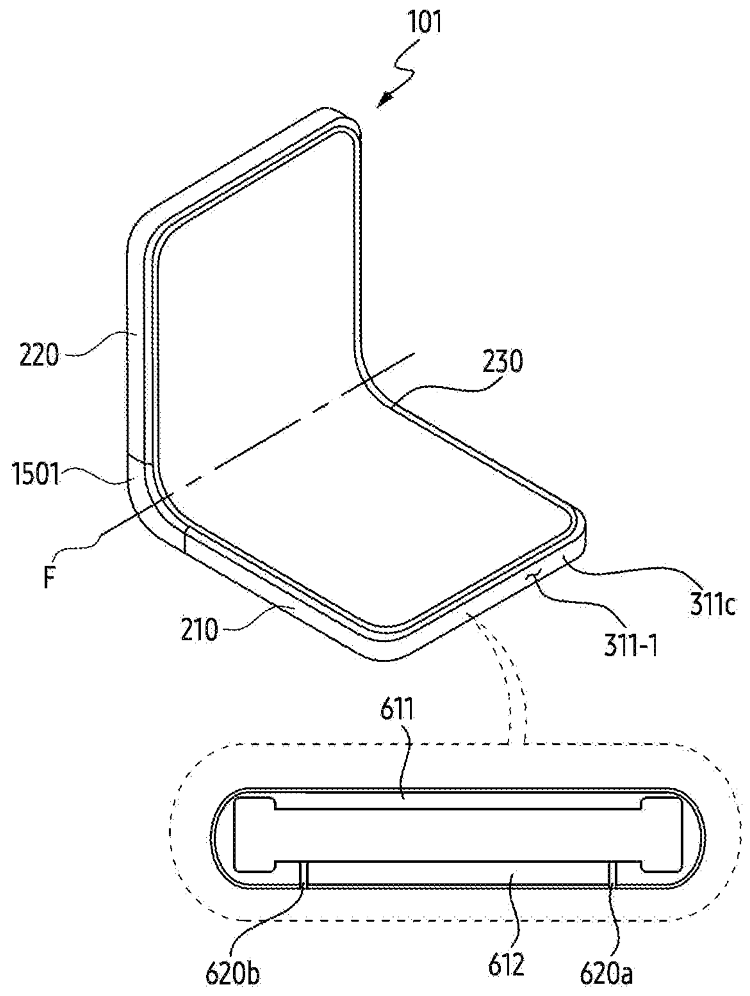

FIG. 15 is a perspective view of an exemplary electronic device.

Referring to FIG. 15, the electronic device 101 may include a first housing 210 and a second housing 220 connected to each other to be folded or unfolded with respect to a folding axis F. The electronic device 101 may be referred to as a foldable electronic device 101. The first housing 210 and the second housing 220 may be rotatably connected through the hinge structure 1501. The display 230 may extend from the first housing 210 across the hinge structure 1501 to the second housing 220.

For example, the electronic device 101 may have an unfolding state in which the first housing 210 and the second housing 220 form substantially the same plane, a folding state in which the first housing 210 and the second housing 220 face each other, or an intermediate state between the unfolding state and the folding state. FIG. 15 illustrates the intermediate state of the electronic device 101.

The first housing 210 may include a side member 311*c* forming the side surface of the first housing 210. The side member 311*c* may include a first conductive portion 611 disposed along a part of the boundary of the side surface 311-1 in which an audio hole and/or a connector hole are formed, and a second conductive portion 612 disposed along another part of the side surface 311-1. The first conductive portion 611 and the second conductive portion 612 may be electrically separated by non-conductive portions 620*a* and 620*b*. In FIG. 15, the side surface is illustrated as a side surface parallel to the folding axis F, but is not limited thereto. For example, the side surface may be a side surface perpendicular to the folding axis F.

The at least one processor (e.g., the processor 120 of FIG. 1 and/or the communication processor) may be configured to feed power to the first conductive portion 611 and/or the second conductive portion 612. An operation of the at least one processor may be referred to as the operations illustrated in FIGS. 9B and 9C.

For example, the at least one processor may communicate with an external electronic device through the first conductive portion 611. When the first conductive portion 611 is in contact with the user's hand, a state of the coupling signal of the first signal transmitted through the first conductive portion 611 and/or a state of the second signal received through the first conductive portion 611 may be different from a reference state. Based on the state of the coupling signal of the first signal and/or the state of the second signal, the at least one processor may electrically disconnect the first conductive portion 611 and the RFFE (e.g., the RFFE 532 in FIG. 9A), and electrically connect the second conductive portion 612 and the RFFE (e.g., the RFFE 532 in FIG. 9A). The at least one processor may select an antenna suitable for the state of the electronic device 101.

In addition, the operation of the at least one processor may be applied substantially the same to the electronic device 101 having a folded or unfolded structure. For example, the descriptions may be applied substantially the same to a laptop.

Figure 16:
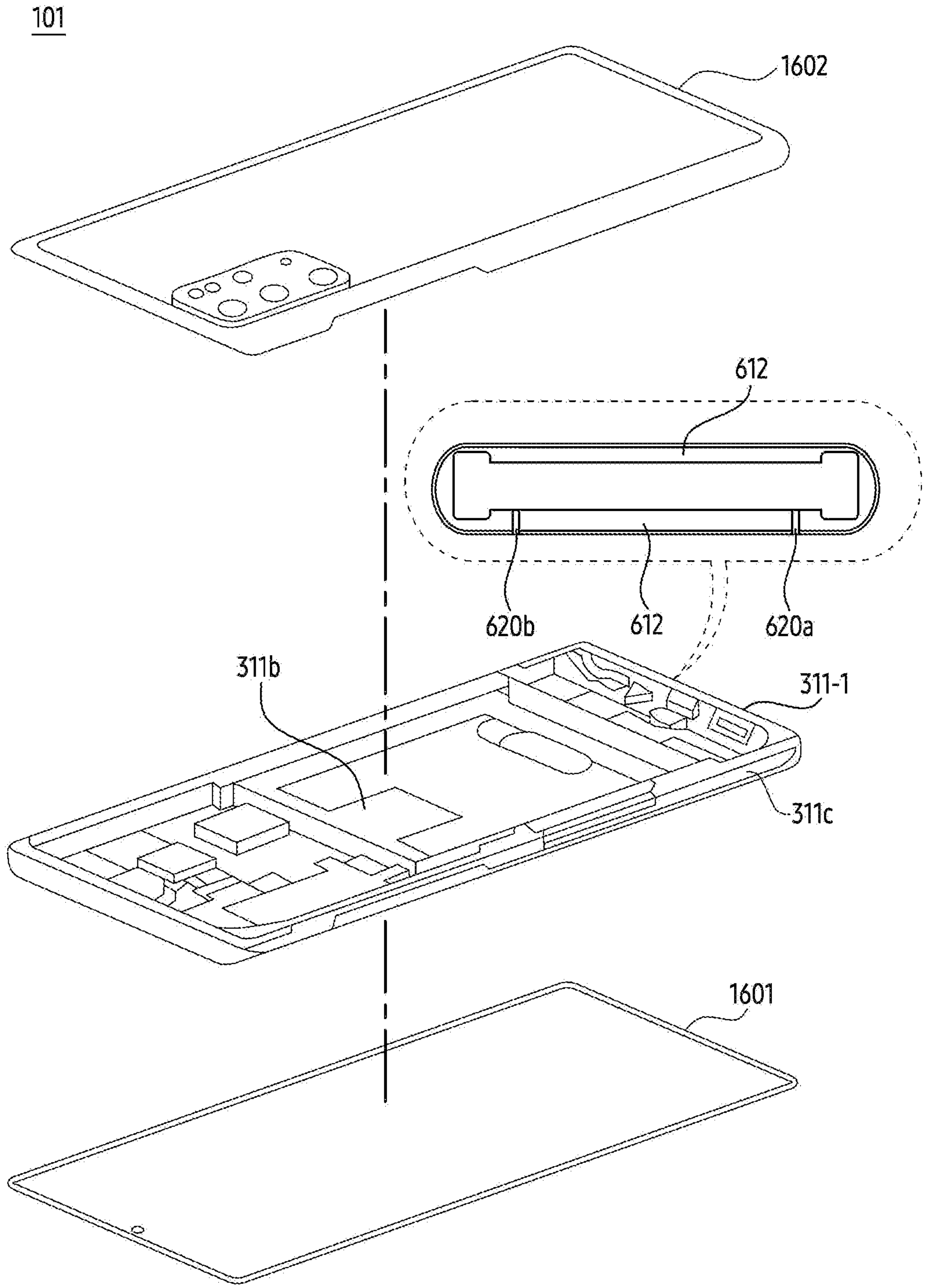
FIG. 16 is an exploded perspective view of an exemplary electronic device.

FIG. 16 is an exploded perspective view of an exemplary electronic device.

Referring to FIG. 16, the electronic device 101 may include a first plate 1601, a second plate 1602 opposite to the first plate 1601, and a side member 311*c* disposed between the first plate 1601 and the second plate 1602.

The side member 311*c* may include a first conductive portion 611 disposed along a part of the boundary of the side surface 311-1 in which an audio hole and/or a connector hole are formed, and a second conductive portion 612 disposed along another part of the side surface. The first conductive portion 611 and the second conductive portion 612 may be electrically separated by non-conductive portions 620*a* and 620*b*.

The at least one processor (e.g., the processor 120 of FIG. 1 and/or the communication processor) may be configured to feed power to the first conductive portion 611 and/or the second conductive portion 612. An operation of the at least one processor may be referred to as the operations illustrated in FIGS. 9B and 9C.

For example, the at least one processor may communicate with an external electronic device through the first conductive portion 611. When the first conductive portion 611 contacts to the user's hand, a state of the coupling signal of the first signal transmitted through the first conductive portion 611 and/or a state of the second signal received through the first conductive portion 611 may be different from a reference state. Based on the state of the coupling signal of the first signal and/or the state of the second signal, the at least one processor may electrically disconnect the first conductive portion 611 and the RFFE (e.g., the RFFE 532 in FIG. 9A), and electrically connect the second conductive portion 612 and the RFFE (e.g., the RFFE 532 in FIG. 9A) by controlling a switch (e.g., the switch circuit 630 in FIG. 9A). The at least one processor may select an antenna suitable for the state of the electronic device 101.

An electronic device (e.g., the electronic device 101 in FIG. 5) may include a first housing (e.g., the first housing 210 in FIG. 5), a second housing (e.g., the second housing 220 in FIG. 2C), a display (e.g., the display 230 in FIG. 5), and at least one processor (e.g., the processor 120 in FIG. 1). The second housing may be movably connected to the first housing in a first direction and a second direction opposite to the first direction. The display may include a first portion (e.g., the first portion 230*a* in FIG. 5) and a second portion (e.g., the second portion 230*b* in FIG. 5). The first area may be located on the second housing. The second area may extend from the first area. The second area may be exposed to the outside according to the second housing moved in the first direction. The second portion may be rolled into the first housing as the second housing moves in the second direction. The at least one processor may be configured to communicate with an external electronic device. The first housing may include a side member (e.g., the side member 311*c* of FIG. 5). The side member may include a first surface (e.g., the first surface 311-1 of FIG. 5) facing in a fourth direction opposite to a third direction in which the first portion of the display faces. The side member may include a second surface (e.g., the second surface 311-2 of FIG. 5) opposite to the first surface and side surfaces surrounding a part of the support member. The side member may include side surfaces at least partially surrounding the first surface and the second surface. The side surfaces may comprise a third surface (e.g., the third surface 311-3 of FIG. 5) facing the second direction. The third surface comprises a first conductive portion (e.g., the first conductive portion 611 of FIG. 5) and a second conductive portion (e.g., the second conductive portion 612 of FIG. 5). The first conductive portion may extend along a part of a boundary of a third surface (e.g., the third surface 311-3 of FIG. 5) facing the second direction among the side surfaces. The second conductive portion may extend along another part of the boundary of the third surface. The second conductive portion may be electrically separated from the first conductive portion. The at least one processor may be configured to receive or transmit a communication signal by feeding power to the first conductive portion or the second conductive portion. The electronic device may be configured to communicate with an external electronic device through any one of the side surfaces among the side surfaces of the electronic device. The first conductive portion and the second conductive portion of the side surface may have different radiation characteristics when operated as an antenna. For example, the resonant frequency of the first antenna by the first conductive portion and the resonant frequency of the second antenna by the second conductive portion may be different. The electronic device may select the most suitable antenna according to a use state and communicate with the external electronic device through the selected antenna.

The electronic device may further include a radio frequency front end (e.g., the RFFE 532 in FIG. 9A) and a switch (e.g., the switch circuit 630 in FIG. 9A). The RFFE may include a coupler electrically connectable to the first conductive portion and the second conductive portion. The switch circuit may be configured to connect the first conductive portion and the RFFE or connect the second conductive portion and the RFFE. The at least one processor may be configured to feed the first conductive portion based on connecting the first conductive portion and the RFFE through the switch circuit. The at least one processor may be configured to feed the second conductive portion based on connecting the second conductive portion and the RFFE through the switch circuit.

The electronic device may further comprise a radio frequency integrated circuit (e.g., the RFIC 522 of FIG. 9A) between the at least one processor and the RFFE.

The at least one processor may be configured to transmit a first signal obtained by using the RFIC and the RFFE to the first conductive portion connected to the RFFE. The at least one processor may be configured to obtain a coupling signal of the first signal through the coupler. The at least one processor may be configured to identify whether a state of the coupling signal of the first signal corresponds to a reference state. The at least one processor may be configured to maintain transmitting the first signal through the first conductive portion, based on the state of the coupling signal of the first signal corresponding to the reference state.

The at least one processor may be configured to disconnect the connection between the RFFE and the first conductive portion and connect the RFFE to the second conductive portion, through the switch circuit, based on the state of the coupling signal of the first signal different from the reference state. The at least one processor may be configured to transmit the first signal through the second conductive portion in response to connecting the RFFE to the second conductive portion through the switch circuit. The electronic device may select any one of the first conductive portion or the second conductive portion as an antenna for transmitting a communication signal based on a transmission state of the communication signal. The coupling signal of the first signal may indicate the transmission state. Since the radiation characteristic of the first conductive portion and the second conductive portion are different, the electronic device may select a more suitable one between a first conductive portion and a second conductive portion according to a reception state of a signal.

The at least one processor may be configured to obtain a second signal received through the first conductive portion by using the RFIC and the RFFE. The at least one processor may be configured to identify whether a state of the second signal corresponds to the reference state. The at least one processor may be configured to maintain receiving the second signal through the first conductive portion, based on the state of the second signal corresponding to the reference state.

The at least one processor may be configured to disconnect the connection between the RFFE and the first conductive portion and connect the RFFE to the second conductive portion, through the switch circuit, based on the state of the second signal different from the reference state. The at least one processor may be configured to receive the second signal through the second conductive portion in response to connecting the RFFE to the second conductive portion through the switch circuit. The electronic device may select any one of the first conductive portion and the second conductive portion as an antenna for receiving the communication signal based on a reception state of the communication signal. Since the radiation characteristic of the first conductive portion and the second conductive portion are different, the electronic device may select a more suitable one between a first conductive portion and a second conductive portion according to a reception state of a signal.

The side member may include an opening (e.g., the opening 311*d* of FIG. 5). The opening may be formed along the boundary of the third surface and may extend to the inside of the cover. The opening may be filled with a non-conductive material. The first conductive portion and the second conductive portion may be spaced apart from each other through the opening. When feeding power to the first conductive portion, a current flowing along the first conductive portion may not be induced to the second conductive portion.

The third surface may include a first boundary (e.g., the first boundary b1 of FIG. 5), a second boundary (e.g., the second boundary b2 of FIG. 5), a third boundary (e.g., the third boundary b3 of FIG. 5), and a fourth boundary (e.g., the fourth boundary b4 of FIG. 5). The first boundary may be located on substantially the same plane as the first surface. The second boundary may be opposite to the first boundary. The third boundary may face a fifth direction perpendicular to the second direction and located between the first boundary and the second boundary. The fourth boundary may be located between the first boundary and the second boundary and face a sixth direction opposite to the fifth direction. The second conductive portion may be disposed along a part of the first boundary. The first conductive portion may extend from a first non-conductive portion (e.g., the first non-conductive portion 621 of FIG. 5) in contact with one end of the second conductive portion, through the third boundary, the second boundary, and the fourth boundary, to a second non-conductive portion (e.g., the second non-conductive portion 622 of FIG. 5) in contact with another end of the second conductive portion opposite to the one end.

The side member may further include a third conductive portion (e.g., the third conductive portion 613 of FIG. 10) electrically separated from the first conductive portion and the second conductive portion. The first conductive portion may extend along a part of the second boundary. The second conductive portion may extend from a first non-conductive portion in contact with one end of the first conductive portion to a third non-conductive portion (e.g., the third non-conductive portion 623 of FIG. 10) in the first boundary, through the second boundary and the third boundary. The third conductive portion may extend from a second non-conductive portion contacting another end opposite to the one end of the first conductive portion to the third non-conductive portion, through the second boundary and the fourth boundary. The at least one processor may be configured to receive or transmit a communication signal by feeding power to the first conductive portion, the second conductive portion, or the third conductive portion.

The first conductive portion may extend from the first non-conductive portion disposed closer to the fourth boundary than the third boundary, within the first boundary b1, through the first boundary, the fourth boundary, and the second boundary, to the second non-conductive portion disposed closer to the third boundary than the fourth boundary, within the second boundary. The second conductive portion may extend from the first non-conductive portion, through the first boundary and the third boundary, to the second conductive portion.

The first conductive portion may extend along a part of the first boundary. The second conductive portion may extend along a part of the second boundary. The first conductive portion and the second conductive portion may be implemented in various forms. For example, a length of the first conductive portion and a length of the second conductive portion may be different from each other. Since the resonant frequency of the antenna is adjusted according to the length of the antenna, resonant frequencies of the first antenna by the first conductive portion and the second antenna by the second conductive portion may be different. The at least one processor may select any one of the first antenna and the second antenna in which the resonant frequency partially overlaps. For example, when the length of the first conductive portion is longer than the length of the second conductive portion, a radiation area of the first antenna may be wider than a radiation area of the second antenna. The at least one processor may communicate with an external electronic device through the first antenna. When the user grips the first conductive portion by hand, the radiation performance of the first antenna may be degraded as the impedance of the first conductive portion changes. As described above, the at least one processor may communicate with an external electronic device through the second antenna.

The side member may include a fourth surface (e.g., the fourth surface 311-4 of FIG. 5) and a fifth surface (e.g., the fifth surface 311-5 of FIG. 5. The fourth surface may be disposed between the first surface and the second surface, and face a fifth direction perpendicular to the second direction. The fifth surface may be disposed between the first surface and the second surface, and face a sixth direction opposite to the fifth direction. The first conductive portion or the second conductive portion may contact each of a non-conductive portion (e.g., the non-conductive portion 620*a* of FIG. 5) in the fourth surface and a non-conductive portion (e.g., the non-conductive portion 620*b* of FIG. 5) in the fifth surface. The first conductive portion and/or the second conductive portion may form a part of the fourth surface and a part of the fifth surface. The first conductive portion and/or the second conductive portion may be electrically separated from another part of the fourth surface and another part of the fifth surface through the non-conductive portion. Through the structure, the first conductive portion and/or the second conductive portion may operate as an antenna through a power feeding.

The at least one processor may be configured to communicate with the external electronic device based on a first resonant frequency set based on a length of the first conductive portion through the first conductive portion, when feeding to the first conductive portion. The at least one processor may be configured to communicate with the external electronic device based on a second resonant frequency set based on a length of the second conductive portion through the second conductive portion, when feeding to the second conductive portion. A length of the first conductive portion and a length of the second conductive portion may be different from each other. The resonant frequencies of the first antenna by the first conductive portion and the second antenna by the second conductive portion may be different from each other. The at least one processor may communicate with an external electronic device by feeding power to the first antenna or the second antenna.

The electronic device may further include a first printed circuit board (e.g., the first printed circuit board 324 of FIG. 5) and a second printed circuit board (e.g., the second printed circuit board 327 of FIG. 5). The first printed circuit board may be disposed on the second housing. The second printed circuit board may electrically connect the first printed circuit board to the first conductive portion and the second conductive portion. The at least one processor may be electrically connected to the first conductive portion and the second conductive portion through the first printed circuit board and the second printed circuit board.

The second printed circuit board may include a first contact portion (e.g., the first contact portion 327-1 of FIG. 7A) contacting the first conductive portion and a second contact portion (e.g., the second contact portion 327-2 of FIG. 7A) contacting the second contact portion. The at least one processor may be electrically connected to the first conductive portion and the second conductive portion through the second printed circuit board. The at least one processor may provide a power signal to the first conductive portion and the second conductive portion through the second printed circuit board.

An electronic device may include a first housing, a second housing, a display, an RFFE, a switch, an RFIC, and at least one processor. The first housing may include a cover including a first conductive portion and a second conductive portion electrically separated from the first conductive portion. The second housing may be movably connected to the first housing in a first direction or a second direction opposite to the first direction. The display may include a first area and a second area. The first area may be disposed on the second housing. The second area may extend from the first area. The second area may be exposed to the outside according to the second housing moved in the first direction. The second area may be rolled into the first housing as the second housing moves in the second direction. The RFFE may include a coupler connectable to the first conductive portion and the second conductive portion. The switch may be configured to connect the first conductive portion and the RFFE or to connect the second conductive portion and the RFFE. The RFIC may be located between the at least one processor and the RFFE. The at least one processor may be configured to communicate with an external electronic device. The at least one processor may be configured to transmit the first signal based on a state of the coupling signal of the first signal when transmitting the first signal to the external electronic device, through any one of the first conductive portion or the second conductive portion. The at least one processor may be configured to receive the second signal based on the state of the second signal identified based on the second signal when receiving a second signal from the external electronic device, through any one of the first conductive portion or the second conductive portion. The electronic device may be configured to communicate with an external electronic device through any one of the side surfaces of the electronic device. The first conductive portion and the second conductive portion of the side surface may have different radiation characteristics when operated as an antenna. For example, the resonant frequency of the first antenna by the first conductive portion and the resonant frequency of the second antenna by the second conductive portion may be different. The electronic device may select the most suitable antenna according to the use state and communicate with the external electronic device through the selected antenna.

The at least one processor may be configured to transmit the first signal obtained by using the RFIC and the RFFE through the first conductive portion connected to the RFFE. The at least one processor may be configured to obtain a coupling signal of the first signal through the coupler. The at least one processor may be configured to identify whether a state of the coupling signal of the first signal corresponds to a reference state. The at least one processor may be configured to maintain transmitting the first signal through the first conductive portion based on the state of the coupling signal of the first signal corresponding to the reference state.

The at least one processor may be configured to disconnect the RFFE from the first conductive portion and connect the RFFE to the second conductive portion through the switch, based on the state of the coupling signal of the first signal different from the reference state. The at least one processor may be configured to transmit the first signal through the second conductive port. The electronic device may select any one of the first conductive portion and the second conductive portion as an antenna for transmitting a communication signal based on a transmission state of the communication signal. The coupling signal of the first signal may indicate the transmission state. Since the radiation characteristics of the first conductive portion and the second conductive portion are different, the electronic device may select a more suitable one of the first conductive portion and the second conductive portion according to a signal reception state.

The at least one processor may be configured to obtain a second signal received through the first conductive portion by using the RFIC and the RFFE. The at least one processor may be configured to identify whether the state of the second signal corresponds to the reference state. The at least one processor may be configured to maintain receiving the second signal through the first conductive portion based on the state of the second signal corresponding to the reference state.

The at least one processor may be configured to disconnect the RFFE from the first conductive portion and connect the RFFE to the second conductive portion based on the state of the second signal different from the reference state, through the switch. The at least one processor may be configured to receive the second signal through the second conductive port. The electronic device may select any one of the first conductive portion and the second conductive portion as an antenna for receiving a communication signal, based on a reception state of the communication signal. Since the radiation characteristics of the first conductive portion and the second conductive portion are different, the electronic device may select a more suitable one of the first conductive portion and the second conductive portion according to a signal reception state.

An electronic device may include: a first housing; a second housing movably coupled to the first housing, the second housing being configured to slide with respect to the first housing along a first direction and a second direction that is opposite to the first direction; a display including a first area and a second area, the first area being disposed on the second housing, the second area extending from the first area, the second area being configured to (i) be exposed to an outside environment as the second housing moves in the first direction and (ii) be rolled into the first housing as the second housing moves in the second direction; and at least one processor configured to communicate with an external electronic device. The first housing may include a side member. The side member may include: a first surface facing a fourth direction that is opposite to a third direction, the first area of the display facing the third direction, a second surface opposite to the first surface, and side surfaces at least partially surrounding the first surface and the second surface. The side surfaces may include a third surface facing the second direction. The third surface may include: a first conductive portion disposed along a first part of a boundary of the third surface; and a second conductive portion disposed along a second part of the boundary of the third surface, the second conductive portion being electrically separated from the first conductive portion. The at least one processor may be further configured to receive and/or transmit a communication signal by feeding to the first conductive portion and/or the second conductive portion.

The electronic device may further include: a radio frequency front end (RFFE) including a coupler electrically connectable to the first conductive portion and the second conductive portion; and a switch circuit configured to alternatively connect the first conductive portion with the RFFE or connect the second conductive portion with the RFFE. The at least one processor may be further configured to: feed the first conductive portion based on connecting the first conductive portion with the RFFE through the switch circuit; and feed the second conductive portion based on connecting the second conductive portion with the RFFE through the switch circuit.

The electronic device may further include: a radio frequency integrated circuit (RFIC) communicably disposed between the at least one processor and the RFFE. The at least one processor may be further configured to: transmit a first signal obtained by using the RFIC and the RFFE to the first conductive portion connected to the RFFE; obtain a coupling signal of the first signal through the coupler; identify whether a state of the coupling signal of the first signal corresponds to a reference state; and maintain transmitting the first signal through the first conductive portion, based on the state of the coupling signal of the first signal corresponding to the reference state.

The at least one processor may be further configured to: disconnect the RFFE from the first conductive portion and connect the RFFE to the second conductive portion, through the switch circuit, based on the state of the coupling signal of the first signal being different from the reference state; and in response to connecting the RFFE to the second conductive portion through the switch circuit, transmit the first signal through the second conductive portion.

The electronic device may further include: a radio frequency integrated circuit (RFIC) communicably disposed between the at least one processor and the RFFE. The at least one processor may be further configured to: obtain a second signal received through the first conductive portion by using the RFIC and the RFFE; identify whether a state of the second signal corresponds to a reference state; and maintain receiving the second signal through the first conductive portion, based on the state of the second signal corresponding to the reference state.

The at least one processor may be further configured to: disconnect the RFFE from the first conductive portion and connect the RFFE to the second conductive portion, through the switch circuit, based on the state of the second signal being different from the reference state; and in response to connecting the RFFE to the second conductive portion through the switch circuit, receive the second signal through the second conductive portion.

The side member may include an opening defined along the boundary of the third surface and extending into the first housing. The opening may be filled with a non-conductive material.

The third surface may further include: a first boundary where the first surface and the third surface contact each other; a second boundary opposite to the first boundary; a third boundary between the first boundary and the second boundary, the third boundary being disposed to face a fifth direction that is perpendicular to the second direction; and a fourth boundary between the first boundary and the second boundary, the fourth boundary being disposed to face a sixth direction that is opposite to the fifth direction. The second conductive portion being disposed along a second part of the boundary of the third surface may include being disposed along a part of the first boundary. The first conductive portion may extend from a first non-conductive portion in contact with one end of the second conductive portion, through the third boundary, the second boundary, and the fourth boundary, to a second non-conductive portion in contact with another end of the second conductive portion opposite to the one end.

The third surface may further include: a first boundary where the first surface and the third surface contact each other; a second boundary opposite to the first boundary; a third boundary between the first boundary and the second boundary, the third boundary being disposed to face a fifth direction that is perpendicular to the second direction; and a fourth boundary between the first boundary and the second boundary, the fourth boundary being disposed to face a sixth direction that is opposite to the fifth direction. The third surface may further include a third conductive portion that is electrically separated from the first conductive portion and the second conductive portion. The first conductive portion being disposed along a first part of the boundary of the third surface may include being disposed along a part of the second boundary. The second conductive portion may extend from a first non-conductive portion in contact with one end of the first conductive portion, through the second boundary and the third boundary, to a third non-conductive portion in the first boundary. The third conductive portion may extend from a second non-conductive portion in contact with another end of the first conductive portion that is opposite to the one end, through the second boundary and the fourth boundary, to the third non-conductive portion. The at least one processor may be further configured to receive and/or transmit the communication signal by feeding to the first conductive portion, the second conductive portion, and/or the third conductive portion.

The third surface may further include: a first boundary where the first surface and the third surface contact each other; a second boundary opposite to the first boundary; a third boundary between the first boundary and the second boundary, the third boundary being disposed to face a fifth direction that is perpendicular to the second direction; and a fourth boundary between the first boundary and the second boundary, the fourth boundary being disposed to face a sixth direction that is opposite to the fifth direction. The first conductive portion may extend from a first non-conductive portion that is disposed closer to the fourth boundary than the third boundary, within the first boundary, through the first boundary, the fourth boundary, and the second boundary, to a second non-conductive portion that is disposed closer to the third boundary than the fourth boundary, within the second boundary. The second conductive portion may extend from the first non-conductive portion, through the first boundary and the third boundary, to the second non-conductive portion.

The third surface may include: a first boundary where the first surface and the third surface contact each other; and a second boundary opposite to the first boundary. The first conductive portion being disposed along the first part of the boundary of the third surface may include being disposed along a part of the second boundary. The second conductive portion being disposed along the second part of the boundary of the third surface may include being disposed along a part of the first boundary.

The side surfaces may further include: a fourth surface disposed between the first surface and the second surface, the fourth surface facing a fifth direction that is perpendicular to the second direction; and a fifth surface disposed between the first surface and the second surface, the fifth surface facing a sixth direction that is opposite to the fifth direction. The first conductive portion or the second conductive portion may contact each of a non-conductive portion in the fourth surface and a non-conductive portion in the fifth surface.

The at least one processor may be further configured to: communicate with the external electronic device, based on a first resonant frequency that is set based on a length of the first conductive portion, through the first conductive portion, when feeding to the first conductive portion; and communicate with the external electronic device, based on a second resonant frequency that is set based on a length of the second conductive portion, through the second conductive portion, when feeding to the second conductive portion.

The electronic device may further include: a first printed circuit board disposed on the second housing; and a second printed circuit board electrically connecting the at least one processor to the first conductive portion and the second conductive portion. The at least one processor may be further configured to be electrically connected to the first conductive portion and the second conductive portion, through the first printed circuit board and the second printed circuit board.

The second printed circuit board may include: a first contact portion that is in contact with the first conductive portion; and a second contact portion that is in contact with the second conductive portion.

An electronic device may include: a first housing that includes a first conductive portion and a second conductive portion, the second conductive portion being electrically separated from the first conductive portion; a second housing movably coupled to the first housing, the second housing being configured to slide with respect to the first housing along a first direction and a second direction that is opposite to the first direction; a display including a first area and a second area, the first area being disposed on the second housing, the second area extending from the first area, the second area being configured to (i) be exposed to an outside environment as the second housing moves in the first direction and (ii) be rolled into the first housing as the second housing moves in the second direction; a radio frequency front end (RFFE) comprising a coupler electrically connectable to the first conductive portion and the second conductive portion; a switch circuit configured to alternatively connect the first conductive portion with the RFFE or connect the second conductive portion with the RFFE; a radio frequency integrated circuit (RFIC) communicably disposed between the at least one processor and the RFFE; and at least one processor. The at least one processor may be configured to: transmit a first signal to an external electronic device through the first conductive portion or the second conductive portion based on a state of a coupling signal of the first signal; and receive a second signal from the external electronic device through the first conductive portion or the second conductive portion based on a state of the second signal that is identified based on the second signal.

The at least one processor may be further configured to: transmit the first signal obtained by using the RFIC and the RFFE to the first conductive portion connected to the RFFE; obtain the coupling signal of the first signal through the coupler; identify whether the state of the coupling signal of the first signal corresponds to a reference state; and maintain transmitting the first signal through the first conductive portion, based on the state of the coupling signal of the first signal corresponding to the reference state.

The at least one processor may be further configured to: disconnect the RFFE from the first conductive portion and connect the RFFE to the second conductive portion, through the switch circuit, based on the state of the coupling signal of the first signal being different from the reference state; and in response to connecting the RFFE to the second conductive portion through the switch circuit, transmit the first signal through the second conductive portion.

The at least one processor may be configured to: obtain a second signal received through the first conductive portion by using the RFIC and the RFFE; identify whether a state of the second signal corresponds to the reference state; and maintain receiving the second signal through the first conductive portion, based on the state of the second signal corresponding to the reference state.

The at least one processor may be configured to: disconnect the RFFE from the first conductive portion and connect the RFFE to the second conductive portion, through the switch circuit, based on the state of the second signal being different from the reference state; and in response to connecting the RFFE to the second conductive portion through the switch circuit, receive the second signal through the second conductive portion.

The electronic device according to various embodiments disclosed in the present document may be various types of devices. The electronic device may include, for example, a portable communication device (e.g., a smartphone), a computer device, a portable multimedia device, a portable medical device, a camera, a wearable device, or a home appliance. The electronic device according to an embodiment of the present document is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this document, each of the phrases such as "A or B", "at least one of A and B", "at least one of A, B and C", "at least one of A, B, or C", and "at least one of A, B, or C" may include any one of the phrases together, or all possible combinations thereof. Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present document may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present document may be implemented as software (e.g., a program) including one or more instructions stored in a storage medium (or external memory) readable by a device (e.g., wearable device 100). For example, a processor (e.g., a processor) of a device (e.g., wearable device 100) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. Here, the term 'non-transitory' only means that a storage medium is a device that is tangible and does not include a signal (e.g., electromagnetic wave), and the term does not distinguish between a case where data is semi-permanently stored and a case where it is temporarily stored.

According to an embodiment, a method according to various embodiments disclosed in the present document may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration. According to various embodiments, operations performed by a module, a program, or other components may be executed sequentially, in parallel, repeatedly, or heuristic, performed in a different order, omitted, or one or more other operations may be added.

What is claimed is:

1. An electronic device comprising:

a first housing;

a second housing movably coupled to the first housing, the second housing being configured to slide with respect to the first housing along a first direction and a second direction that is opposite to the first direction;

a display including a first area and a second area, the first area being disposed on the second housing, the second area extending from the first area, the second area being configured to (i) be exposed to an outside environment as the second housing moves in the first direction and (ii) be rolled into the first housing as the second housing moves in the second direction; and at least one processor configured to communicate with an external electronic device, wherein the first housing comprises a side member, the side member comprising:

a first surface facing a fourth direction that is opposite to a third direction, the first area of the display facing the third direction, a second surface opposite to the first surface, and side surfaces at least partially surrounding the first surface and the second surface, wherein the side surfaces comprise a third surface facing the second direction, the third surface comprising:

a first conductive portion disposed along a first part of a boundary of the third surface; and a second conductive portion disposed along a second part of the boundary of the third surface, the second conductive portion being electrically separated from the first conductive portion, wherein the at least one processor is further configured to receive and/or transmit a communication signal by feeding to the first conductive portion and/or the second conductive portion.

2. The electronic device of claim 1, further comprising:

a radio frequency front end (RFFE) comprising a coupler electrically connectable to the first conductive portion and the second conductive portion; and a switch circuit configured to alternatively connect the first conductive portion with the RFFE or connect the second conductive portion with the RFFE, wherein the at least one processor is further configured to:

feed the first conductive portion based on connecting the first conductive portion with the RFFE through the switch circuit; and feed the second conductive portion based on connecting the second conductive portion with the RFFE through the switch circuit.

3. The electronic device of claim 2, further comprising:

a radio frequency integrated circuit (RFIC) communicably disposed between the at least one processor and the RFFE, wherein the at least one processor is further configured to:

transmit a first signal obtained by using the RFIC and the RFFE to the first conductive portion connected to the RFFE;

obtain a coupling signal of the first signal through the coupler;

identify whether a state of the coupling signal of the first signal corresponds to a reference state; and maintain transmitting the first signal through the first conductive portion, based on the state of the coupling signal of the first signal corresponding to the reference state.

4. The electronic device of claim 3, wherein the at least one processor is further configured to:

disconnect the RFFE from the first conductive portion and connect the RFFE to the second conductive portion, through the switch circuit, based on the state of the coupling signal of the first signal being different from the reference state; and in response to connecting the RFFE to the second conductive portion through the switch circuit, transmit the first signal through the second conductive portion.

5. The electronic device of claim 2, further comprising:

a radio frequency integrated circuit (RFIC) communicably disposed between the at least one processor and the RFFE, wherein the at least one processor is further configured to:

obtain a second signal received through the first conductive portion by using the RFIC and the RFFE;

identify whether a state of the second signal corresponds to a reference state; and maintain receiving the second signal through the first conductive portion, based on the state of the second signal corresponding to the reference state.

6. The electronic device of claim 5, wherein the at least one processor is further configured to:

disconnect the RFFE from the first conductive portion and connect the RFFE to the second conductive portion, through the switch circuit, based on the state of the second signal being different from the reference state; and in response to connecting the RFFE to the second conductive portion through the switch circuit, receive the second signal through the second conductive portion.

7. The electronic device of claim 1, wherein the side member comprises an opening defined along the boundary of the third surface and extending into the first housing, wherein the opening is filled with a non-conductive material.

8. The electronic device of claim 1, wherein the third surface further comprises:

a first boundary where the first surface and the third surface contact each other;

a second boundary opposite to the first boundary;

a third boundary between the first boundary and the second boundary, the third boundary being disposed to face a fifth direction that is perpendicular to the second direction; and a fourth boundary between the first boundary and the second boundary, the fourth boundary being disposed to face a sixth direction that is opposite to the fifth direction, wherein the second conductive portion being disposed along a second part of the boundary of the third surface includes being disposed along a part of the first boundary, wherein the first conductive portion extends from a first non-conductive portion in contact with one end of the second conductive portion, through the third boundary, the second boundary, and the fourth boundary, to a second non-conductive portion in contact with another end of the second conductive portion opposite to the one end.

9. The electronic device of claim 1, wherein the third surface further comprises:

a first boundary where the first surface and the third surface contact each other;

a second boundary opposite to the first boundary;

a third boundary between the first boundary and the second boundary, the third boundary being disposed to face a fifth direction that is perpendicular to the second direction; and a fourth boundary between the first boundary and the second boundary, the fourth boundary being disposed to face a sixth direction that is opposite to the fifth direction, wherein the third surface further comprises a third conductive portion that is electrically separated from the first conductive portion and the second conductive portion, wherein the first conductive portion being disposed along a first part of the boundary of the third surface includes being disposed along a part of the second boundary, wherein the second conductive portion extends from a first non-conductive portion in contact with one end of the first conductive portion, through the second boundary and the third boundary, to a third non-conductive portion in the first boundary, wherein the third conductive portion extends from a second non-conductive portion in contact with another end of the first conductive portion that is opposite to the one end, through the second boundary and the fourth boundary, to the third non-conductive portion, wherein the at least one processor is further configured to receive and/or transmit the communication signal by feeding to the first conductive portion, the second conductive portion, and/or the third conductive portion.

10. The electronic device of claim 1, wherein the third surface further comprises:

a first boundary where the first surface and the third surface contact each other;

a second boundary opposite to the first boundary;

a third boundary between the first boundary and the second boundary, the third boundary being disposed to face a fifth direction that is perpendicular to the second direction; and a fourth boundary between the first boundary and the second boundary, the fourth boundary being disposed to face a sixth direction that is opposite to the fifth direction, wherein the first conductive portion extends from a first non-conductive portion that is disposed closer to the fourth boundary than the third boundary, within the first boundary, through the first boundary, the fourth boundary, and the second boundary, to a second non-conductive portion that is disposed closer to the third boundary than the fourth boundary, within the second boundary, wherein the second conductive portion extends from the first non-conductive portion, through the first boundary and the third boundary, to the second non-conductive portion.

11. The electronic device of claim 1, wherein the third surface includes:

a first boundary where the first surface and the third surface contact each other; and a second boundary opposite to the first boundary, wherein the first conductive portion being disposed along the first part of the boundary of the third surface includes being disposed along a part of the second boundary, wherein the second conductive portion being disposed along the second part of the boundary of the third surface includes being disposed along a part of the first boundary.

12. The electronic device of claim 1, wherein the side surfaces further comprise:

a fourth surface disposed between the first surface and the second surface, the fourth surface facing a fifth direction that is perpendicular to the second direction; and a fifth surface disposed between the first surface and the second surface, the fifth surface facing a sixth direction that is opposite to the fifth direction, wherein the first conductive portion or the second conductive portion contacts each of a non-conductive portion in the fourth surface and a non-conductive portion in the fifth surface.

13. The electronic device of claim 1, wherein the at least one processor is further configured to:

communicate with the external electronic device, based on a first resonant frequency that is set based on a length of the first conductive portion, through the first conductive portion, when feeding to the first conductive portion; and communicate with the external electronic device, based on a second resonant frequency that is set based on a length of the second conductive portion, through the second conductive portion, when feeding to the second conductive portion.

14. The electronic device of claim 1, further comprising:

a first printed circuit board disposed on the second housing; and a second printed circuit board electrically connecting the at least one processor to the first conductive portion and the second conductive portion, wherein the at least one processor is further configured to be electrically connected to the first conductive portion and the second conductive portion, through the first printed circuit board and the second printed circuit board.

15. The electronic device of claim 14, wherein the second printed circuit board comprises:

a first contact portion that is in contact with the first conductive portion; and a second contact portion that is in contact with the second conductive portion.

16. An electronic device comprising:

a first housing that comprises a first conductive portion and a second conductive portion, the second conductive portion being electrically separated from the first conductive portion;

a second housing movably coupled to the first housing, the second housing being configured to slide with respect to the first housing along a first direction and a second direction that is opposite to the first direction;

a display including a first area and a second area, the first area being disposed on the second housing, the second area extending from the first area, the second area being configured to (i) be exposed to an outside environment as the second housing moves in the first direction and (ii) be rolled into the first housing as the second housing moves in the second direction;

a radio frequency front end (RFFE) comprising a coupler electrically connectable to the first conductive portion and the second conductive portion;

a switch circuit configured to alternatively connect the first conductive portion with the RFFE or connect the second conductive portion with the RFFE;

a radio frequency integrated circuit (RFIC) communicably disposed between the at least one processor and the RFFE; and at least one processor configured to:

transmit a first signal to an external electronic device through the first conductive portion or the second conductive portion based on a state of a coupling signal of the first signal; and receive a second signal from the external electronic device through the first conductive portion or the second conductive portion based on a state of the second signal that is identified based on the second signal.

17. The electronic device of claim 16, wherein the at least one processor is further configured to:

transmit the first signal obtained by using the RFIC and the RFFE to the first conductive portion connected to the RFFE;

obtain the coupling signal of the first signal through the coupler;

identify whether the state of the coupling signal of the first signal corresponds to a reference state; and maintain transmitting the first signal through the first conductive portion, based on the state of the coupling signal of the first signal corresponding to the reference state.

18. The electronic device of claim 17, wherein the at least one processor is further configured to:

disconnect the RFFE from the first conductive portion and connect the RFFE to the second conductive portion, through the switch circuit, based on the state of the coupling signal of the first signal being different from the reference state; and in response to connecting the RFFE to the second conductive portion through the switch circuit, transmit the first signal through the second conductive portion.

19. The electronic device of claim 16, wherein the at least one processor is configured to:

obtain a second signal received through the first conductive portion by using the RFIC and the RFFE;

identify whether a state of the second signal corresponds to the reference state; and maintain receiving the second signal through the first conductive portion, based on the state of the second signal corresponding to the reference state.

20. The electronic device of claim 19, wherein the at least one processor is configured to:

disconnect the RFFE from the first conductive portion and connect the RFFE to the second conductive portion, through the switch circuit, based on the state of the second signal being different from the reference state; and in response to connecting the RFFE to the second conductive portion through the switch circuit, receive the second signal through the second conductive portion.

* * * * *